(12) United States Patent
Cho et al.

(10) Patent No.: US 10,158,783 B2
(45) Date of Patent: Dec. 18, 2018

(54) CLOUD SERVER, IMAGE FORMING DEVICE, AND PRINTING CONTROL METHOD

(71) Applicant: S-PRINTING SOLUTION CO., LTD., Suwon-si, Gyeonggi-do (KR)

(72) Inventors: Jae-wook Cho, Seoul (KR); Tae-jung Yun, Seoul (KR); Chang-seok Choi, Suwon-si (KR); Yong-im Kim, Seoul (KR); Hong-seock Kim, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/306,367

(22) PCT Filed: Dec. 23, 2014

(86) PCT No.: PCT/KR2014/012695
§ 371 (c)(1),
(2) Date: Oct. 24, 2016

(87) PCT Pub. No.: WO2015/167108
PCT Pub. Date: Nov. 5, 2015

(65) Prior Publication Data
US 2017/0048416 A1 Feb. 16, 2017

(30) Foreign Application Priority Data

Apr. 30, 2014 (KR) .................. 10-2014-0052264
Jun. 2, 2014 (KR) .................. 10-2014-0066847
Oct. 1, 2014 (KR) .................. 10-2014-0132581

(51) Int. Cl.
*G06F 3/12* (2006.01)
*H04N 1/32* (2006.01)
(Continued)

(52) U.S. Cl.
CPC ....... *H04N 1/32545* (2013.01); *G06F 3/1204* (2013.01); *G06F 3/126* (2013.01);
(Continued)

(58) Field of Classification Search
None
See application file for complete search history.

(56) References Cited

U.S. PATENT DOCUMENTS

2009/0009795 A1* 1/2009 Kong ................. H04N 1/00222
358/1.15
2011/0007347 A1 1/2011 Kamath et al.
(Continued)

FOREIGN PATENT DOCUMENTS

CN 1364256 8/2002
CN 1674621 9/2005
(Continued)

OTHER PUBLICATIONS

Written Opinion of the International Searching Authority dated Mar. 27, 2015 in corresponding International Patent Application No. PCT/KR2014/012695 (6 pages) (6 pages English Translation).
(Continued)

*Primary Examiner* — Dov Popovici
(74) *Attorney, Agent, or Firm* — Staas & Halsey LLP

(57) ABSTRACT

Disclosed is a cloud server. The cloud server comprises: a control unit for generating a work group including a plurality of image forming devices which can be controlled by a mobile device; a UI generation unit for generating a UI capable of receiving an input of a virtual grouping job coupled to a plurality of tasks supported by the plurality of image forming devices, respectively; and a communication interface unit for providing a UI which has been generated in the mobile device.

14 Claims, 32 Drawing Sheets

(51) Int. Cl.
*G06F 15/16* (2006.01)
*H04N 1/00* (2006.01)
*G06K 15/00* (2006.01)

(52) U.S. Cl.
CPC .......... *G06F 3/1262* (2013.01); *G06F 3/1287* (2013.01); *G06F 3/1288* (2013.01); *G06F 3/1292* (2013.01); *G06F 15/16* (2013.01); *H04N 1/00307* (2013.01); *H04N 1/00344* (2013.01); *H04N 1/00954* (2013.01); *H04N 2201/001* (2013.01); *H04N 2201/0094* (2013.01)

(56) References Cited

U.S. PATENT DOCUMENTS

2011/0176162 A1   7/2011   Kamath et al.
2012/0026548 A1   2/2012   Nakagawa
2012/0140285 A1   6/2012   Kamath et al.
2013/0222837 A1   8/2013   Watanabe

FOREIGN PATENT DOCUMENTS

| CN | 1766827 | 5/2006 |
|---|---|---|
| CN | 103186354 | 7/2013 |
| WO | WO 2013/052641 A2 | 4/2013 |
| WO | WO 2015/167108 A1 | 11/2015 |

OTHER PUBLICATIONS

International Search Report dated Mar. 27, 2015 in corresponding International Patent Application No. PCT/KR2014/012695 (2 pages).
Forms PCT/IB/304 dated Jan. 6, 2015 and PCT/IB/306 dated Nov. 19, 2015 in corresponding International Patent Application No. PCT/KR2014/012695 (2 pages).

* cited by examiner

SUPPORT FOR VIRTUAL GROUPING USING ANY#

SUPPORT FOR VIRTUAL GROUPING USING ANY#

SUPPORT FOR VIRTUAL GROUPING USING ANY#

FIG. 15
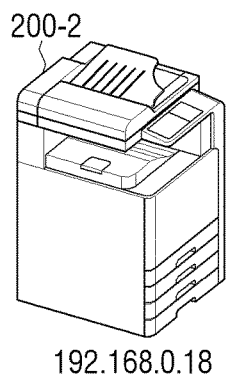
200-2
192.168.0.18
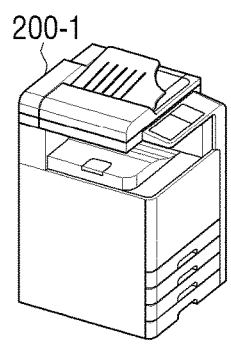
200-1
192.168.0.1
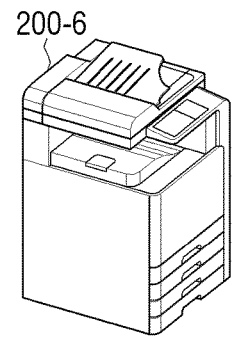
200-6
192.168.0.200
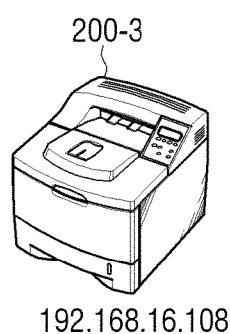
200-3
192.168.16.108
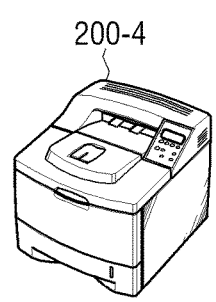
200-4
192.168.0.211
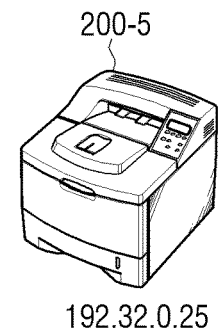
200-5
192.32.0.25

FIG. 27

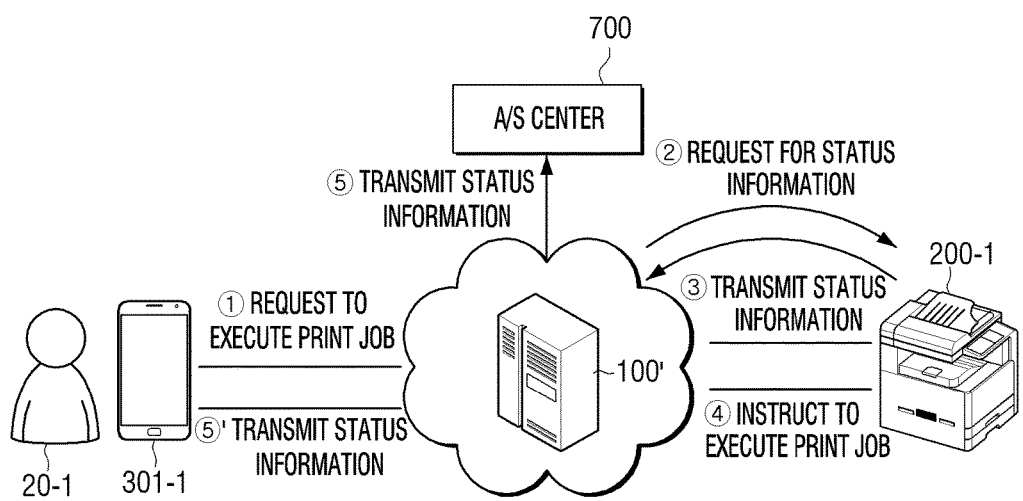

| Any# printing | | | | |
|---|---|---|---|---|
| APARTMENT BUILDING-A GROUP-PRINTER(010-1234-5678) | | | | |
| | PHONE NUMBER | DATE OF USE | USE HISTORY | CHARGING INFORMATION |
| 1 | 010-2345-6789 | 2014-01-05<br>2014-01-21<br>2014-01-30 | GRAYSCALE PRINT 10 SHEETS<br>COLOR PRINT 5 SHEETS<br>GRAYSCALE PRINT 30 SHEETS | 1,000 WON<br>1,500 WON<br>3,000 WON |
| | | CUMULATIVE CHARGING INFORMATION | | 5,500 WON |
| | PHONE NUMBER | DATE OF USE | USE HISTORY | CHARGING INFORMATION |
| 2 | 010-3456-7890 | 2014-01-10<br>2014-01-11<br>2014-01-20<br>2014-01-25 | GRAYSCALE PRINT 50 SHEETS<br>GRAYSCALE PRINT 50 SHEETS<br>GRAYSCALE PRINT 50 SHEETS<br>GRAYSCALE PRINT 50 SHEETS | 5,000 WON<br>5,000 WON<br>5,000 WON<br>5,000 WON |
| | | CUMULATIVE CHARGING INFORMATION | | 20,000 WON |

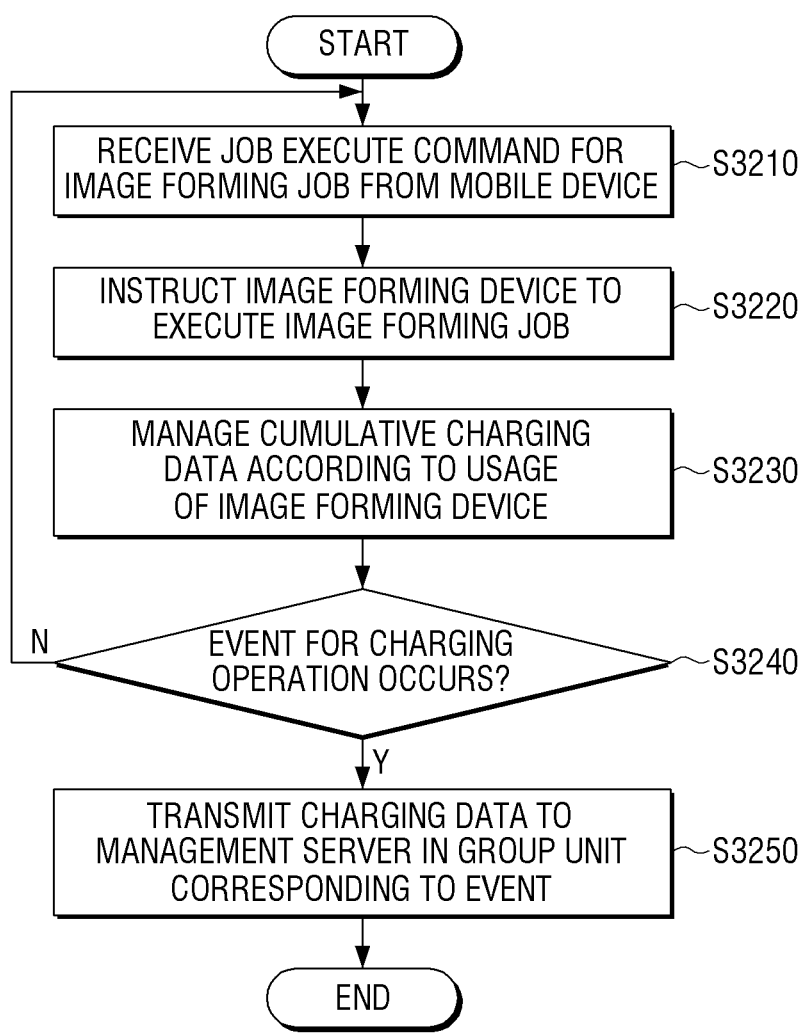

CLOUD SERVER, IMAGE FORMING DEVICE, AND PRINTING CONTROL METHOD

CROSS-REFERENCE TO RELATED APPLICATIONS

This application is a U.S. national stage application of PCT international application PCT/2014/012695, filed on Dec. 23, 2014 and claims the benefits of Korean Patent Application No. 10-2014-0052264, filed on Apr. 30, 2014, Korean Patent Application No. 10-2014-0066847, filed on Jun. 2, 2014, and Korean Patent Application No. 10-2014-0132581, filed on Oct. 1, 2014, respectively, the contents are incorporated herein by reference.

TECHNICAL FIELD

The present general inventive concept generally relates to a cloud server, an image forming device, and a printing control method, and more particularly, to a cloud server that is capable of grouping a plurality of image forming devices to extend functions of each image forming device, an image forming device, and a printing control method.

BACKGROUND OF THE INVENTION

Generally, an image forming device refers to a device that prints out print data generated in a terminal device, such as, a computer, on recording paper. Such image forming device may include a copier, a printer, a facsimile, or a Multi-Function Peripheral (MFP) that realizes functions of the copier, printer, and facsimile in a single device, for example.

By way of example, several or dozens of image forming devices may be used in companies or public offices. In such environment, a user is able to select an image forming device for performing a job.

In this case, the user selects an image forming device that supports a function that the user wants to use or an image forming device that is capable of executing the desired rapidly.

However, in many cases, an image forming device that satisfies the user needs is the latest-model image forming device installed lately. Accordingly, in a printing environment consisting of a plurality of image forming devices, jobs are concentrated on a certain image forming device rather than equally being distributed to each of the plurality of image forming devices.

As an example, when a plurality of users want to perform copy jobs in a network environment consisting of one MFP and four printers, the copy jobs of the plurality of users are concentrated on the one MFP, and the other four printer are not used.

As another example, when a user wants to perform a copy job in a network environment consisting of one scanner and four printers, the scanner and printers cannot perform the copy job. Accordingly, a copier or an MFP for performing the copy job needs to be installed additionally. Alternatively, the user should scan a document using the scanner and then print out a scan image using the printer to perform the copy job.

In recent years, a cloud printing system has been introduced briskly, which goes beyond a system that simply connects an image forming device with a host computer or connects a mobile device with a plurality of image forming devices through a wired and/or wireless network.

The cloud printing system refers to a system for providing a user with an image forming service by means of an image forming device connected to a cloud server over internet.

To be specific, the user may access the cloud server by using a mobile device and request for the image forming service to the image forming device connected to the cloud server. When a printing service is provided according to this method, it is required to charge a fee for the image forming service. Specially, when the user uses the image forming device connected to the cloud server continuously, a regular charging operation is required rather than one-time charging.

DETAILED DESCRIPTION OF THE INVENTION

Technical Purpose

The present disclosure has been provided to address the aforementioned and other problems and disadvantages occurring in the related art, and an aspect of the present disclosure provides a cloud server that is capable of grouping a plurality of image forming devices to extend the functions of each image forming device, an image forming device, and a printing control method.

Further, another aspect of the present disclosure provides a cloud server that supports an image forming service for a plurality of mobile devices and manages charging data, a method thereof, and an image forming system.

According to an embodiment of the present disclosure, there is provided a cloud server. The cloud server includes a control unit configured to generate a work group including a plurality of image forming devices controlled by the mobile device, a User Interface (UI) generation unit configured to generate a UI for receiving a virtual grouping job coupled to a plurality of tasks supported by the plurality of image forming devices, respectively, and a communication interface unit configured to provide the mobile device with the generated UI.

In response to receiving a job execute command for the virtual grouping job, the control unit may control the communication interface unit such that a first image forming device of the plurality of image forming devices executes a part of the virtual grouping job by performing at least one task among the plurality of tasks corresponding to the virtual grouping job, and a second image forming device of the plurality of image forming devices executes the other of the virtual grouping job that was not executed by the first image forming device.

The control unit may control the communication interface unit such that control commands related to the virtual grouping job with respect to the first image forming device and the second image forming device are transmitted to the first image forming device in batches.

The control unit may control the communication interface unit such that a control command for executing a part of the virtual grouping job is transmitted to the first image forming device, and a control command for executing the other of the virtual grouping job is transmitted to the second image forming device.

The UI generation unit may generate a UI for receiving a job which is executable through a combination of tasks of the plurality of image forming devices in a work group corresponding to the mobile device.

The UI generation unit may generate the UI as a webpage.

The communication interface unit may receive phone numbers for specifying each of the plurality of image forming devices from the mobile device. The group generation unit may generate a work group including the plurality of image forming devices corresponding to the received phone numbers.

The communication interface unit may receive the phone numbers and a function number for specifying a function of an image forming device. The group generation unit may generate a work group including a task of an image forming device corresponding to the received phone numbers and function number.

The communication interface unit may receive work group information on the plurality of image forming devices from the image forming device and generate a work group based on the received work group information.

The control unit may generate a phone number corresponding to the virtual grouping job, and in response to receiving a request for a job with respect to the phone number, allows the virtual grouping job corresponding to the phone number to be executed.

According to an embodiment of the present disclosure, there is provided an image forming device connectable to a cloud server. The device includes a communication interface unit configured to receive a job execute command for a job using a plurality of tasks in a work group including a plurality of image forming devices from the cloud server, a task processing unit configured to execute a part of the job by performing at least one task among the plurality of tasks corresponding to the job, and a communication interface unit configured to control the first communication interface unit to transmit the other of the job that was not performed by the task processing unit to other image forming device in the work group.

According to an embodiment of the present disclosure, there is provided a printing control method in a cloud server connectable to a mobile device. The method includes generating a work group including a plurality of image forming devices controlled by the mobile device, generating a User Interface (UI) for receiving a virtual grouping job coupled to a plurality of tasks supported by the plurality of image forming devices, respectively, and providing the mobile device with the generated UI.

The method may further include receiving a job execute command for the virtual grouping job and allowing a first image forming device of the plurality of image forming devices to execute a part of the virtual grouping job by performing at least one task among the plurality of tasks corresponding to the virtual grouping job and allowing a second image forming device of the plurality of image forming devices to execute the other of virtual grouping job that was not executed by the first image forming device.

The generating the UI may include generating a UI for receiving a job which is executable through a combination of tasks of the plurality of image forming devices in a work group corresponding to the mobile device.

The generating the UI may include generating the UI as a webpage.

The method may further include receiving phone numbers for specifying each of the plurality of image forming devices from the mobile device. The generating the work group may include generating a work group including the plurality of image forming devices corresponding to the received phone numbers.

The method may further include receiving the phone numbers and a function number for specifying a function of an image forming devices. The generating the work group may include generating a work group including a task of an image forming device corresponding to the received phone numbers and function number.

The method may further include receiving work group information on the plurality of image forming devices from the image forming device. The generating the work group may include generating a work group based on the received work group information.

The method may further include generating a phone number corresponding to the virtual grouping job and allowing, in response to receiving a request for a job with respect to the phone number, the virtual grouping job corresponding to the phone number to be executed.

According to an embodiment of the present disclosure, there is provided a printing control method of an image forming device connectable to a cloud server. The method includes receiving a job execute command for a job using a plurality of tasks in a work group including a plurality of image forming devices from the cloud server, executing a part of the job by performing at least one task among the plurality of tasks corresponding to the job, and transmitting the other of the job that was not executed by the image forming device to other image forming device in the work group.

The present disclosure has been provided to address the aforementioned and other problems and disadvantages occurring in the related art. A cloud server according to another aspect of the present disclosure includes a communication interface unit configured to communicate with a mobile device and at least one image forming device, a storage unit configured to store unique information on a plurality of mobile devices, and a control unit configured to, in response to receiving a job execute command for an image forming job from the mobile device, instruct an image forming device of the at least one image forming device to execute the image forming job, the image forming device being matched with the mobile device, and in response to the image forming job being executed, match charging data according to usage of the image forming device with the unique information on the mobile device and manage cumulative charging data.

In response to receiving a request for the charging data from a management server connected though the communication interface unit, the control unit may transmit the charging data to the management server.

The control unit may transmit the charging data to the management server based on any one of a predetermined data transmission cycle or the predetermined number of data accumulation.

The storage unit may further store a group name of a group including the at least one image forming device and device identification information. In this case, in response to receiving a request for use registration with respect to the at least one image forming device from the mobile device, the control unit may match the device identification information on the at least one image forming device with unique information on the mobile device in a group including the at least one image forming device and store the matched information in the storage unit.

In response to receiving a request for use registration with respect to an image forming device of the at least one image forming device from the mobile device, the control unit may transmit an application for controlling the image forming device to the mobile device.

The control unit may request for status information on the image forming device before transmitting the image forming job to the image forming device matched with the unique information on the mobile device. In response to the image forming device being unable to execute a job, the control unit may transmit the status information to the mobile device.

The control unit may request for the status information on the image forming device before transmitting the image forming job to the image forming device matched with the unique information on the mobile device. In response to the image forming device being unable to execute a job, the control unit may transmit the status information to a pre-registered after-sales service (A/S) center.

The unique information on the mobile device may be one of a phone number of the mobile device, user information on the mobile device, and a serial number of a Universal Subscriber Identity Module (USIM) installed in the mobile device.

The storage unit may classify and store the unique information on a plurality of mobile devices into a plurality of groups. In this case, in response to an event for a charging operation occurring, the control unit may read the charging data stored in the storage unit and transmit the charging data to the management server.

According to an embodiment of the present disclosure, there is provided an image forming system providing an image forming service. The image forming system includes an image forming device, a management sever configured to manage usage of the image forming device matched with at least one mobile device, and a cloud server configured to, in response to receiving a request to execute an image forming job using the image forming device from the at least one mobile device, instruct the image forming device to execute the image forming job, in response to the image forming job being executed in the image forming device, match charging data according to usage of the image forming device with unique information on the mobile device and manage cumulative charging data.

In response to an event for a charging operation occurring, the cloud server may transmit the charging data with respect to the at least one mobile device matched with the image forming device to the management server.

In response to receiving the charging data from the cloud server, the management server may transmit charging data corresponding to the at least one mobile device to the mobile device by using the charging data.

In response to receiving the charging data from the cloud server, the management server may transmit the charging data corresponding to the image forming device such that the charging data is outputted according to the at least one mobile device.

In response to receiving the charging data from the cloud server, the management server may withdraw an amount corresponding to the charging data by using account information on an account related to the at least one mobile device.

The event for a charging operation may be one of an event where a request with respect to the charging data is received from the management server, an event where a predetermined data transmission cycle elapses, and an event where the number of data accumulation configured in connection with the charging data overruns.

The management server may manage the at least one mobile device matched with the image forming device in a group unit.

According to an embodiment of the present disclosure, there is provided a method for supporting an image forming service of a cloud server. The method includes instructing, in response to receiving a job execute command for an image forming job from a mobile device, an image forming device of at least one image forming device which communicates with the mobile device to execute the image forming job, the image forming device being matched with the mobile device, and matching, in response to the image forming job being executed, charging data according to usage of the image forming device with unique information on the mobile device and managing cumulative charging data.

The method may further include classifying and storing the unique information on a plurality of mobile devices into a plurality of groups and in response to an event for a charging operation occurring, reading the charging data on a basis of a group corresponding to the event and transmitting the charging data to a management server for managing the image forming device matched with the mobile device.

BRIEF DESCRIPTION OF DRAWINGS

FIG. 15 is a diagram provided to describe a grouping method according to the seventh embodiment disclosed herein;

FIG. 27 is a diagram provided to describe a method for managing charging data according to execution of a print job;

FIG. 32 is a flowchart provided to describe a method for supporting an image forming service of a cloud server according to an embodiment disclosed herein.

DETAILED DESCRIPTION OF PREFERRED EMBODIMENT

Figure 1:
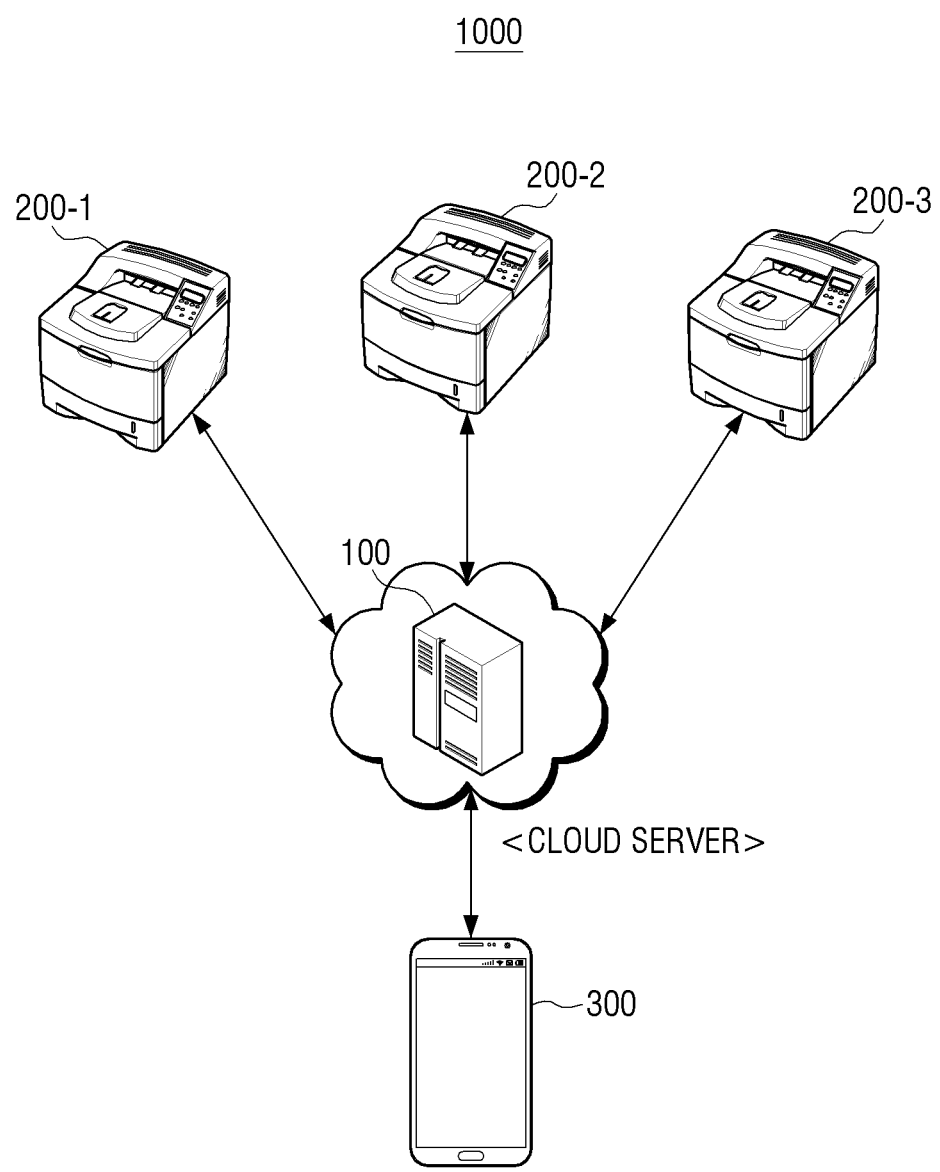
FIG. 1 is a block diagram illustrating an image forming system according to an embodiment disclosed herein.

Certain embodiments are described below in greater detail with reference to the accompanying drawings. In the following description, like drawing reference numerals are used for the like elements, even in different drawings. The matters defined in the description, such as detailed construction and elements, are provided to assist in a comprehensive understanding of embodiments. However, embodiments can be practiced without those specifically defined matters. Also, well-known functions or constructions are not described in detail since they would obscure the application with unnecessary detail.

FIG. 1 is a block diagram illustrating an image forming system according to an embodiment disclosed herein.

Referring to FIG. 1, an image forming system 1000 according to an embodiment may include a cloud server 100, a plurality of image forming devices 200-1, 200-2, 200-3, and a mobile device 300.

The cloud server 100 may execute a job based on a phone number. In this case, executing a job based on a phone number refers to an operation of mapping an image forming device or a mobile device onto a corresponding phone number, registering the image forming device or mobile device at a cloud server, and executing the job through the phone number. In other words, a user may execute a print job by transmitting the job to a pre-registered phone number instead of selecting a network address for executing the print job (or another task).

The cloud server 100 provides the mobile device 300 with a User Interface (UI) for receiving a job execute command with respect to the image forming devices 200-1, 200-2, 200-3. The cloud server 100 receives the job execute command from the mobile device 300 and transmits a control command to the image forming devices 200-1, 200-2, 200-3 corresponding to the received job execute command. In this case, the cloud server 100 may provide the mobile device 300 with a UI for receiving a virtual grouping job coupled to a plurality of tasks supported by the plurality of image forming devices, respectively. Hereinafter, the operation of executing a job using a plurality of image forming devices is referred to as 'virtual grouping job.' The virtual grouping job may be executed in two image forming devices or in three or more image forming devices. A detailed description on the virtual grouping job will be provided below with reference to FIGS. 2 and 3.

The cloud server 100 may generate a work group of image forming devices to participate in the virtual grouping job. To be specific, the cloud server 100 generates the image forming devices registered in association with a user among a plurality of connectable image forming devices as a work group. A detailed description on the functions and operations of the cloud server 100 will be provided below with reference to FIGS. 4 and 5.

The image forming devices 200-1, 200-2, 200-3 receive the job execute command from the cloud server 100 and execute the received job execute command. In this case, the image forming devices 200-1, 200-2, 200-3 may be a printer, a scanner, a copier, a facsimile, or an MFP capable of performing at least one of a printing task, a fax task, and an image editing task (in this case, the task may refer to 'function'). In this embodiment, the job execute command is received through the cloud server 100, but in the implementation, the job execute command may be directly received from the mobile device 300 or received through an input device of the image forming devices 200-1, 200-2, 200-3.

In this case, the image forming devices 200-1, 200-2, 200-3 may receive a job execute command including a control command with respect to other image forming device and may receive only a job execute command applied to the image forming device itself.

When the received job execute command is a command that needs to use a task of other image forming devices 200-2, 200-3, the image forming devices 200-1 may execute a part of an operation (or job, hereinafter referred to as 'job') corresponding to the received job execute command and transmit the other of the job to other image forming devices 200-2, 200-3. In this case, the image forming device 200-1 may transmit all of the other job to one image forming device 200-2 or distribute the other job to the plurality of image forming devices 200-2, 200-3. A detailed description on the components and operations of the image forming devices 200-1, 200-2, 200-3 will be provided below with reference to FIG. 6.

The mobile device 300 receives and displays a UI for controlling functions of the image forming devices 200-1, 200-2, 200-3 from the cloud server 100 and receives the control command with respect to the image forming devices 200-1, 200-2, 200-3 through the displayed UI. In this case, the received control command may be a control command with respect to one image forming device 200-1 or the plurality of image forming devices 200-1, 200-2, 200-3.

The mobile device 300 may request for execution of the job by transmitting the received control command to the cloud server 100. A detailed description on the components and operations of the mobile device 300 will be provided below with reference to FIG. 7. In this case, the mobile device 300 may be a laptop computer, a mobile phone, a smart phone, a Portable Multimedia Player (PMP), an MP3 player, or the like.

As described above, the image forming system 1000 according to this embodiment provides the mobile device 300 with the UI where the tasks of the plurality of image forming devices 200-1, 200-2, 200-3 are combined such that the plurality of image forming devices are controlled. Accordingly, the image forming system 1000 may extend and provide functions that are not supported by the individual image forming device 200 and execute a job more rapidly.

Further, the image forming system 1000 according to this embodiment may select an image forming device to execute a job by using only phone number information, thereby increasing user convenience.

In this embodiment of FIG. 1, one mobile device 300 and three image forming devices are connected to the cloud server 100, but in the implementation, two or more mobile devices 300 may be connected to the cloud server 100, and two image forming devices or four or more image forming devices may be connected to the cloud server 100.

Further, in the implementation, the respective devices may be connected to the cloud server 100 directly or connected to the cloud server 100 indirectly through a router or other devices (for example, a server). In addition, in FIG. 1, the respective devices are connected in a wired manner, but in the implementation, the devices may be connected in a wireless manner.

In FIG. 1, the image forming devices to participate in the virtual grouping job are determined by the cloud server 100, but this operation may be performed by the image forming devices. This example will be described below in further detail with reference to FIG. 6.

In FIG. 1, the mobile device 300 controls the image forming devices 200-1, 200-2, 200-3 through only the cloud server 100 but in the implementation, the mobile device 300 may control the image forming devices 200-1, 200-2, 200-3 by directly communicating with the image forming devices 200-1, 200-2, 200-3.

Further, in FIG. 1, the cloud server 100 is realized as one device, but in the implementation, the cloud server 100 may be realized as a plurality of servers. In this case, one of the plurality of servers may be 'Any # server' that distributes and executes the print job based on the phone number.

Figure 2:
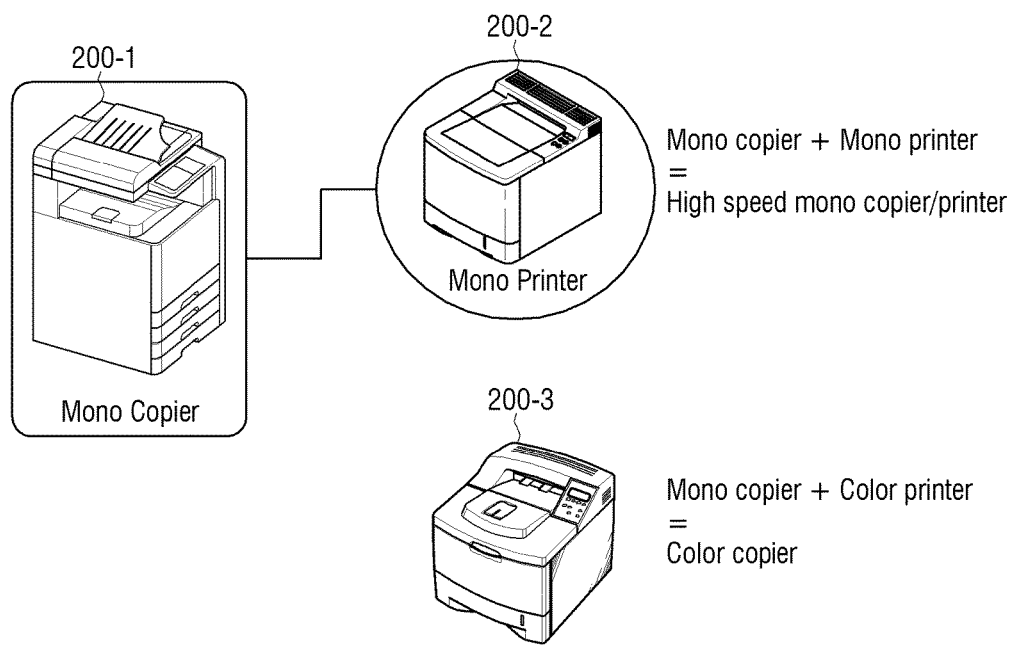
FIGS. 2 and 3 are diagrams provided to describe a virtual grouping operation according to an embodiment disclosed herein.
Figure 3:
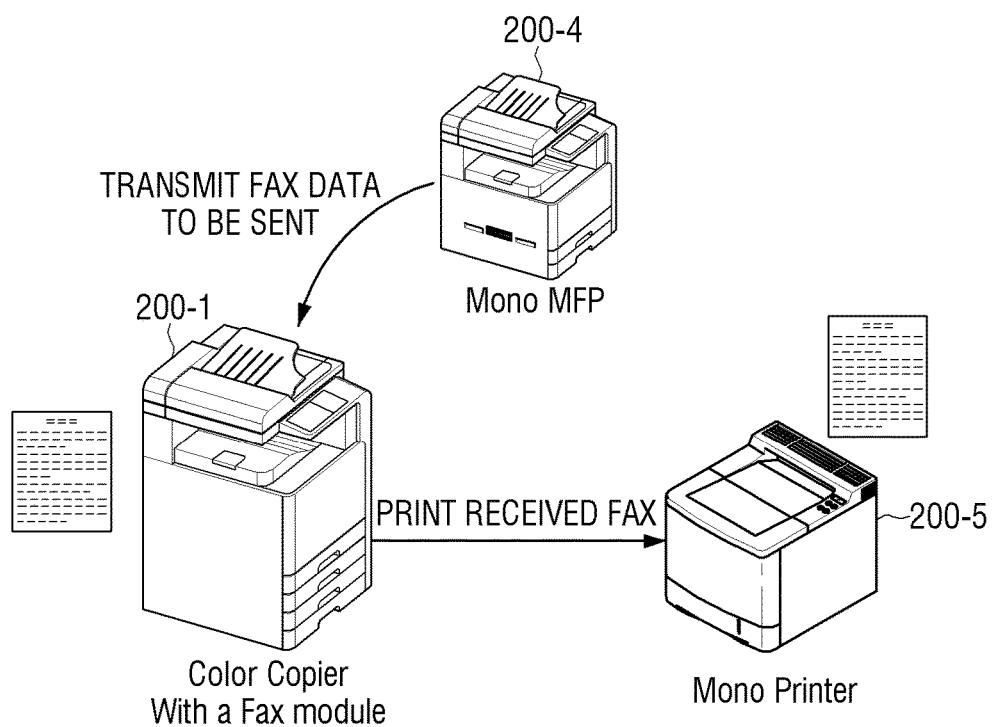

FIGS. 2 and 3 are diagrams provided to describe a virtual grouping operation according to an embodiment disclosed herein.

According to an embodiment, the virtual grouping job refers to an operation of executing one job using a plurality of tasks by a plurality of image forming devices 200-1, 200-2, 200-3. In this case, the tasks may include a scan task, an image forming task, a fax sending task, a fax receiving task, an e-mail sending task, a server transmitting task, a format converting task, an editing task, or the like and may be called 'function.' A copy task is a task where the scan task and the image forming task are combined, and a scan-to-email task or a scan-to-server task is a task where the plurality of tasks are combined.

The virtual grouping job may be realized according to two methods.

The first method uses Device B in order to perform a task that Device A is able to perform more quickly. The second method uses Device B in order to extend a task that Device A is unable to perform. Hereinafter, the first method will be described with reference to FIG. 2, and the second method will be described with reference to FIGS. 2 and 3.

Referring to FIG. 2, an image forming system includes three image forming devices 200-1, 200-2, 200-3.

For convenience in explanation, the functions of the image forming devices of FIG. 2 will be described based on the assumption below. The first image forming device 200-1 is a current image forming device where a user is located to input a job execute command. The first image forming devices 200-1 includes a scanning unit, an image forming unit, and a facsimile unit to support a scan job, a print job, a copy job, a fax sending job, and a fax receiving job. The second image forming device 200-2 is other image forming device that the user does not manipulate. The second image forming device 200-2 includes an image forming unit to support a grayscale print job. That is, the second image forming device 200-2 is a grayscale printer. The third image forming device 200-3 is other image forming device that the user does not manipulate. The third image forming device 200-3 includes a color image forming unit to support a color print job and the grayscale print job. That is, the third image forming device 200-3 is a color printer.

In general, a scanning speed of the scanning unit is faster than a printing speed of the image forming unit. Accordingly, when a copy job (where a scan job and a print job are combined) is performed, the scan job is completed rapidly whereas the print job requires a longer time, thereby increasing user waiting time.

Accordingly, in this embodiment, the job may be executed using both the current first image forming device 200-1 and the second image forming device 200-2. To be specific, the first image forming device 200-1 may generate a scan image by scanning a manuscript and print out a part of the generated scan image. Subsequently, the first image forming device 200-1 may transmit the other of the scan image to the second image forming device 200-2. In this case, the second image forming device 200-2 may execute the print job with respect to the received scan image. Accordingly, according to this method, the entire working time for the copy job may be reduced as compared with the conventional method.

In FIG. 2, only the second image forming device 200-2 participates in the virtual grouping job, but in the implementation, the third image forming device 200-3 may participate in the virtual grouping job instead of the second image forming device 200-2 or both the second image forming device 200-2 and the third image forming device 200-3 may participate in the virtual grouping job. A method for selecting a device to participate in a job will be described below in detail with reference to a task distribution unit of FIG. 5.

The above-described first method may be applied to the copy job, the fax sending job, an e-book generating job, or the like. As an example, the fax sending job requires a long processing time. According to the virtual grouping method, Device A may generate a plurality of scan images, execute a fax sending job for a part of the plurality of scan images, and transmit the other of the scan images to Device B. Device B may execute the fax sending job with respect to the other of the scan images.

As another example, the e-book generating job requires a large amount of scan job. According to the virtual grouping method, Device A may scan a part of a manuscript and generate Scan image C, and Device B may scan the other of the manuscript and generate Scan image D. Device B may receive Scan image C from Device A and image-process Scan image C and Scan image D to generate an e-book.

So far, three kinds of examples for the first virtual grouping method have been described, but in the implementation, there may be any other examples applied to a job using the functions of a plurality of image forming devices.

Hereinafter, the second virtual grouping method will be described.

The image forming unit of the first image forming device 200-1 is a grayscale image forming unit that is unable to execute the color print job. Accordingly, although the scanning unit of the first image forming device 200-1 is able to execute the color scan job, the first image forming device 200-1 is unable to execute the color copy job.

Figure 22:
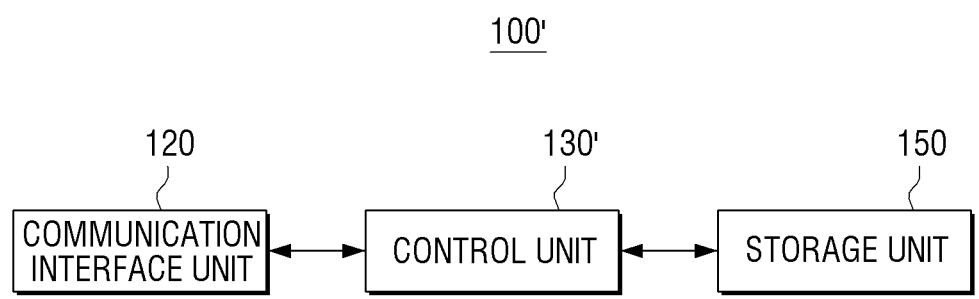
FIG. 22 is a block diagram illustrating a structure of a cloud server according to another embodiment disclosed herein.

However, according to this embodiment, when there is the third image forming device 200-3 that is able to execute the color print job around the first image forming device 200-1, the first image forming device 200-1 may execute the virtual grouping job (or a virtualization function) as supporting the color copy function. In response to the virtual grouping job being executed, the first image forming device 200-1 may display a UI window as illustrated in FIG. 22.

As the first image forming device 200-1 became able to execute the color copy job through the virtual grouping job, the first image forming device 200-1 may receive a color copy command from the user. In this case, the first image forming device 200-1 color-scans the manuscript and generates a color scan image. Subsequently, the first image forming device 200-1 may transmit the generated color scan image to the third image forming device 200-3 such that the transmitted scan image is printed in color. In this case, the first image forming device 200-1 may display information on a situation where the color printout is outputted in the third image forming device 200-3. Accordingly, the color copy job is unavailable in the existing printing environment, but the user may execute the color copy job easily through the virtual grouping job.

The virtual grouping method may be also applied when the first image forming devices 200-1 is a scanner. For example, when the first image forming device 200-1 is a scanner that supports only a scan task, the first image forming device 200-1 may generate a scan image by scanning a manuscript and transmit the generated color-scan image to other image forming devices 200-2, 200-3 that are able to execute the print job. Accordingly, the first image forming device 200-1 does not support the copy job function basically but may perform the copy task using the functions of other image forming devices.

The above-described second method may be applied to the fax sending job, the e-book generating job, or the like, as well as the copy job.

For example, the fax sending job may be executed only in a device with a facsimile unit. As illustrated in FIG. 3, a fourth image forming device 200-4 does not include the facsimile unit and thus, is unable to execute the fax sending job. However, in response to the virtual grouping job according to this embodiment being applied, and the first image forming device 200-1 supporting the fax task, the fourth image forming device 200-4 becomes a device that supports the fax task. Accordingly, the fourth image forming device 200-4 may receive from the user a fax send command for transmitting the manuscript to a fifth image forming device 200-5. The fourth image forming device 200-4 may generate a scan image by scanning the manuscript and transmit the generated scan image to the first image forming device 200-1. In this case, the first image forming device 200-1 may transmit the received scan image to the fifth image forming device 200-5.

In response to the first image forming device 200-1 being located closer to the user than the fourth image forming device 200-4, and both of the first image forming device 200-1 and the fourth image forming device 200-4 being located on the same floor, the user may execute the fax job using the fourth image forming device 200-4 on the same floor without moving to another floor for the fax sending job, which may increase the user convenience and the usability of the exiting office machine that is not frequently used.

Further, the e-book generating job may be executed only in an latest-model image forming device. The fourth image forming device 200-4 is an outdated MFP, and thus, does not provide the e-book generating function. However, in response to the virtual grouping job according to this embodiment being applied, and the first image forming device 200-1 supporting the e-book generating function, the fourth image forming device 200-4 becomes a device that supports the e-book generating function. Accordingly, in response to receiving a command for generating a manuscript as an e-book from the user, the fourth image forming device 200-4 may generate a scan image by scanning the manuscript and transmit the generated scan image to the first image forming device 200-1. The first image forming device 200-1 may generate the received scan image as an e-book. Subsequently, the first image forming device 200-1 may store the generated e-book in a storage designated by the user (for example, a management server).

So far, three kinds of examples for the second virtual grouping method have been described, but in the implementation, there may be any other examples applied to a job using the functions of a plurality of image forming devices.

As described above, the virtual grouping method according to this embodiment may extend the functions that are not supported by the existing image forming devices, thereby increasing the user convenience and the speed of the functions that are supported by the existing image forming devices.

Meanwhile, when the virtual grouping is applied to all of the connectable image forming devices, it may be difficult to select and manage the devices. For example, in the above-described first virtual grouping method, when collecting printouts from other image forming device requires a longer time than outputting the entire printouts in one image forming device, it may causes inconvenience to the user.

Accordingly, it is required to group a plurality of image forming devices efficiently in applying the virtual grouping method. Hereinafter, a method for grouping a plurality of image forming devices will be described with reference to FIG. 4.

Figure 4:
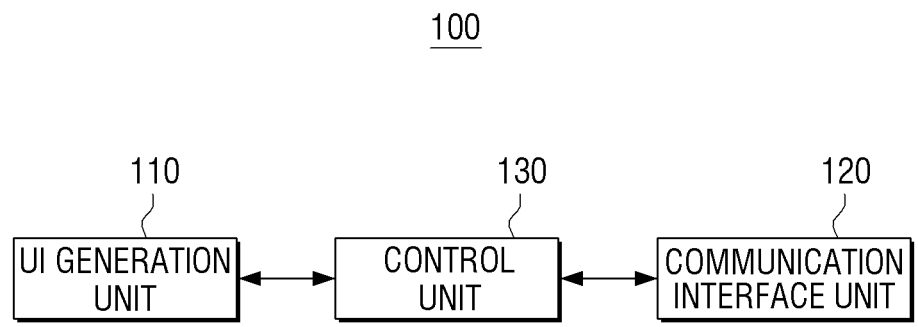
FIG. 4 is a block diagram illustrating a brief structure of a cloud server according to an embodiment disclosed herein.

FIG. 4 is a block diagram illustrating a brief structure of a cloud server according to an embodiment disclosed herein.

Referring to FIG. 4, a cloud server 100 may include a User Interface (UI) generation unit 110, a communication interface unit 120, and a control unit 130.

The UI generation unit 110 generates a UI for receiving a user account. In this case, the generated UI may be a webpage. A user may access a website through a mobile device 300 and log in to the website on the webpage. In this case, log-in information may be a user Identification (ID) and a password. The ID may be a phone number of a mobile device.

The UI generation unit 110 generates a UI for receiving an input of an image forming device to be registered at the user account. To be specific, when an initial user accesses the cloud server 100, there is no image forming device registered at the user account. Accordingly, the UI generation unit 110 may generate a UI for receiving an input of an image forming device to be registered at the user account. In this case, the user may register an image forming device to be used through the generated UI by directly inputting an Internet Protocol (IP) address of the image forming device or receiving a phone number for specifying the image forming device.

The UI generation unit 110 generates a UI for receiving a job execute command with respect to the registered image forming device. In response to a plurality of image forming devices being registered at the user account, the UI generation unit 110 generates a UI for receiving a virtual grouping job coupled to a plurality of tasks supported by the plurality of image forming devices, respectively. More particularly, the UI generation unit 110 may generate a UI for receiving an input of a combination of executable tasks of each of the plurality of image forming devices registered to correspond to the user in a form of a webpage. For example, in response to a first image forming device supporting only a print task, and a second image forming device supporting only a scan task, the UI generation unit 110 may generate a UI for receiving the print task, the scan task, and the copy task (print+scan).

The UI generation unit 110 generates a UI for displaying progress status according to the received job execute command. To be specific, the UI generation unit 110 may display a job progress status according to the received job execute command. In this case, in response to the received job execute command being relevant to a virtual grouping job executed in a plurality of image forming devices, the UI generation unit 110 may display a task progress status in each image forming device. In response to the print task being displayed in a job used by the user, the UI generation unit 110 may generate a UI with location information on an image forming that outputs a printout.

The communication interface unit 120 connects the cloud server 100 with an external device. The communication interface unit 120 may be accessed through a Local Area Network (LAN), an internet network, a Universal Serial Bus (USB) port, and a wireless module. In this case, the wireless module may operate according to wireless communication methods, such as, Wireless-Fidelity (Wi-Fi), Wi-Fi Direct, Near Field Communication (NFC), Bluetooth, or the like.

The communication interface unit 120 may receive user information from the mobile device 300. To be specific, the communication interface unit 120 may receive account information for accessing the user account from the mobile device 300.

The communication interface unit 120 receives information on a new image forming device. To be specific, the communication interface unit 120 may receive the information on a new image forming device to be added to the user account in a form of a phone number. In this case, the communication interface unit 120 may receive function information along with the phone number.

The communication interface unit 120 retrieves connectable image forming devices 200-1, 200-2, 200-3. To be specific, the communication interface unit 120 may retrieve an image forming device that is currently connectable among the image forming devices connected to the received user account.

The communication interface unit 120 receives device information on the retrieved image forming devices 200-1, 200-2, 200-3. To be specific, the communication interface unit 120 may receive the device information on the image forming device corresponding to the user account.

In this case, the device information may include a device name of an image forming device, address information (IP address, MAC information, or the like, that is, information necessary for connection with respect to the image forming device), function information (information on the functions supported by the image forming device, for example, information on availability of the color print function or the scanning function), status information (current job availability, an error status, a job progress status, or the like), and group information (information necessary for generating a work group/A detailed description on the work group will be provided below).

The communication interface unit 120 provides the mobile device 300 with the generated UI. To be specific, in response to receiving the user information from the mobile device 300, the communication interface unit 120 may transmit a user account UI (that is, an image forming device UI connected to the user) corresponding to the user information to the mobile device 300.

The communication interface unit 120 may receive a job execute command from the mobile device 300. Further, the communication interface unit 120 may transmit the received job execute command to the image forming device corresponding to the received job execute command. In this case, the job execute command received from the mobile device 300 may be a command for the virtual grouping job.

The communication interface unit 120 may transmit a command for allowing the first image forming device of the plurality of image forming devices to execute a part of the virtual grouping job by performing at least one task among a plurality of tasks corresponding to the virtual grouping job and allowing the second image forming device of the plurality of image forming devices to execute the other of the virtual grouping job that was not executed by the first image forming device and a control command related to the virtual grouping job with respect to the first and second image forming devices to the first image forming device in batches. Further, the communication interface unit 120 may transmit a control command for allowing the first image forming device to execute a part of the virtual grouping job to the first image forming device and transmit a control command for allowing the second image forming device to execute the other of the virtual grouping job to the second image forming device.

The communication interface unit 120 may receive the progress status related to the virtual grouping job from the image forming device transmitting the virtual grouping job. Further, the communication interface unit 120 may provide the mobile device 300 with the information on the received progress status.

The communication interface unit 120 may receive the information on the plurality of image forming devices selected in the mobile device from the mobile device 300. In this case, the information on the plurality of image forming devices selected in the mobile device may be information on the image forming device that was tagged with the mobile device 300.

The communication interface unit 120 receives print data from the mobile device 300. In this case, the print data may be data of a printer languages, such as, Postscript (PS), Printer Control Language (PCL). or the like. When the image forming device 200 supports direct printing, the print data may be a file itself in a format of PDF, XPS, BMP, JPG, or the like.

The control unit 130 controls overall components of the cloud server 100. Particularly, the control unit 130 generates a work group including a plurality of image forming devices controlled by the mobile device 300. More particularly, the control unit 130 retrieves the image forming devices 200-1, 200-2, 200-3 registered at the user account and group the retrieved image forming devices 200-1, 200-2, 200-3 as a work group in various methods.

The control unit 130 may generate the entire image forming devices 200-1, 200-2, 200-3 registered at the user account as a work group.

Further, the control unit 130 may control the communication interface unit 120 such that the plurality of image forming devices 200-1, 200-2, 200-3 registered at the user account are displayed in the mobile device 300 and generate the image forming devices selected by the mobile device 300 as a work group.

In the above embodiment, the control unit 130 displays a list of the image forming devices 200-1, 200-2, 200-3 registered at the user account and then receives a selection of the image forming devices to be included in the work group from the user. However, in the implementation, the control unit 130 may receive the information on the image forming devices to be included in the work group directly. For example, in response to receiving the information for specifying the image forming device, such as, an IP address, a device name, or an any # phone number (a phone number assigned to an image forming device for executing a cloud print job) of other image forming device, the control unit 130 may add the image forming device corresponding the received information to the work group. This embodiment will be described below in further detail with reference to FIGS. 9 and 10.

Further, in the above embodiment, the control unit 130 displays all of the retrieved image forming devices, but in the implementation, the control unit 130 may display a list of only an image forming device that satisfies a predetermined condition by applying one of the following methods. For example, the control unit 130 may display a list of only an image forming device with an address of the same subnet as the first image forming device 200-1.

Further, the control unit 130 may receive the information on the plurality of image forming devices included in the work group from among the image forming devices 200-1, 200-2, 200-3 and generate a work group based on the received information. In this case, the information on the plurality of image forming devices may be information on an image forming device which is NFC(Near Field Communication)-tagged with the mobile device 300 or information on an image forming device included in the work group among the image forming devices 200-1, 200-2, 200-3 (for example, the any # phone number). This embodiment will be described below in further detail with reference to FIGS. 11 and 12.

Further, the control unit 130 may receive the information on the image forming devices connectable through the LAN and generate the image forming devices that may communicate through the LAN as a work group based on the received information. In this case, the LAN may be Bluetooth. Meanwhile, in the above embodiment, only the Bluetooth was described as an example of the communication method, but in the implementation, other short-range wireless network methods may be used. This embodiment will be described below in detail with reference to FIG. 13.

The control unit 130 may acquire the device names of the image forming devices 200-1, 200-2, 200-3 and generate a work group including the image forming devices with the common identifier. This embodiment will be described below in further detail with reference to FIG. 14.

The control unit 130 may acquire the address information including the IP addresses of the image forming devices 200-1, 200-2, 200-3 and generate a work group using the acquired address information. That is, the control unit 130 may generate the image forming devices in the same subnet as a work group. In this case, the control unit 130 may exclude an image forming device with a Subsystem Identification (SSID) information different from SSID of the image forming devices 200-2, 200-3 with a predetermined hop count from the work group. This embodiment will be described below in further detail with reference to FIG. 15.

The above-described methods for generating a work group may be integrated in series and/or in parallel. As an example, in response to the methods being integrated in series, the control unit 130 may generate only the devices that may perform the mutual LAN communication among the image forming device in the same subnet as a work group by combining the method using the IP address and the method using the LAN.

As another example, in response to the methods being integrated in parallel, the control unit 130 may generate the NFC-tagged image forming device 200-2 as a first work group and generate the image forming devices 200-1 200-3 that may perform the LAN communication as a second work group. In response to a plurality of work groups being generated, and a job execute command for the virtual grouping job being received from the user, the control unit 130 may receive a selection of a work group for executing the job.

Further, according to the above-described methods, a work group may be generated automatically and/or manually. For example, the NFC-tagged image forming devices may be generated as a work group automatically, but in the implementation, a work group may be generated by displaying a list of the tagged image forming devices and receiving a selection of the devices to be generated as the work group among the devices in the displayed list from the user.

The control unit 130 may generate a work group by considering the functions supported by the image forming devices 200-1, 200-2, 200-3. By way of example, the control unit 130 may control the image forming devices such that the image forming devices that may support the general functions, such as, the print task, are grouped in a limited manner by using the above-described grouping method. Further, the control unit 130 may control the image forming devices such that the image forming devices that may perform the infrequently-used tasks, such as, the color print task, the fax sending task job, and the e-book generating task, are included in the work group without limitation.

That is, the control unit 130 may generate the work group in a form where the devices in the work group may perform diverse functions. For instance, in response to the plurality of retrieved image forming devices including one device with the fax sending function, the control unit 130 may control the image forming device to be included in the work group by default.

In response to receiving the log-in information from the mobile device 300, the control unit 130 may control the UI generation unit 110 and the communication interface unit 120 such that a UI corresponding to the log-in information is generated and transmitted.

Further, in response to receiving the job execute command from the mobile device 300, the control unit 130 may determine whether the received job execute command is a command using the virtual grouping method. In response to determining that the received job execute command is a command using the virtual grouping method, the control unit 130 may control a task distribution unit 160 to determine an image forming device to execute the job, a task to be performed in the device, and workload. A detailed description on the task distribution unit 160 will be provided below. Further, the control unit 130 may control the communication interface unit 120 such that the job allocated to each image forming device is performed according to the distributed task.

In response to a predetermined condition being satisfied, the control unit 130 may generate a work group. In this case, the predetermined condition may include a power-on operation of an image forming device, variation of the connectable image forming devices, a periodical time, a user request, registration of user account of a new image forming device, or the like.

In response to a new image forming device being registered at the user account, the control unit 130 may determine whether there is a task that may be additionally performed by the virtual grouping and control the UI generation unit 110 to provide the mobile device 300 with a changed UI for receiving a selection of the additional task.

As described above, the cloud server 100 according to this embodiment generates the plurality of image forming devices registered at the user account as the work group. Accordingly, the cloud server 100 may execute a job related to the functions that are not supported by the image forming device 200. Further, the cloud server 100 may also execute a job related to the functions that are supported by the image forming device 200 by combining the image forming devices in the work group, thereby executing the job more rapidly.

So far, the brief structure of the cloud server 100 was described, but the cloud server 100 may further include any number of other components on top of the above-described components. A more detailed description on the structure of the cloud sever 100 will be provided below with reference to FIG. 5.

Figure 5:
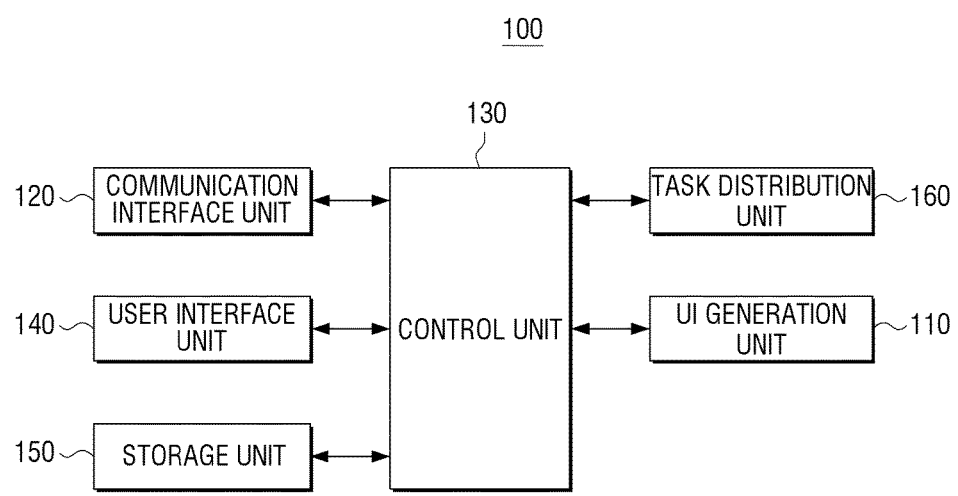
FIG. 5 is a block diagram illustrating a detailed structure of a cloud server according to an embodiment disclosed herein.

FIG. 5 is a block diagram illustrating a detailed structure of a cloud server according to an embodiment disclosed herein.

Referring to FIG. 5, a cloud server 100 may include a User Interface (UI) generation unit 110, a communication interface unit 120, a control unit 130, a user interface unit 140, a storage unit 150, and a task distribution unit 160.

The operations of the UI generation unit 110, the communication interface unit 120, and the control unit 130 are the same as the operations of the corresponding components of FIG. 4, and thus, a repeated description will be omitted.

The user interface unit 140 may include a plurality of function keys that enables a user to configure or select diverse functions supported by the cloud server 100 and display various information provided by the cloud server 100. The user interface unit 140 may be realized as a device that performs an input and an output simultaneously, such as, a touch pad. Further, the user interface unit 140 may be realized by combining an input device, such as, a mouse, a keyboard, or the like, with a display device, such as, a Cathode-Ray Tube (CRT) monitor, a Liquid Crystal Display (LCD), a Light Emitting Diode (LED), or the like.

The storage unit 150 stores information on an user account. In this case, the information on the user account is information including a phone number corresponding to the user account, information for user authentication (for example, the ID, the password, or the like), information on an image forming device corresponding to the user account, or the like.

The storage unit 150 stores information on an image forming device account. In this case, the information on the image forming device account is information including a phone number, a physical address, and an account address of an image forming device 200 and a user account for using the image forming device.

The storage unit 150 may store print data and store a UI generated by the UI generation unit 110.

Further, the storage unit 150 may be realized as a storage medium in the cloud server 100 or an external storage medium, for example, a removable disk including a USB memory, a file server through a network, or the like.

The task distribution unit 160 determines whether to execute an inputted job according to a general method or according to a virtual grouping method. To be specific, in response to an inputted job execute command including a function that is not supported by one image forming devices 200-1, the task distribution unit 160 may determine to execute the job according to the virtual grouping method.

In response to the inputted job execute command being a command using a plurality of tasks, and a job processing speed increasing when a part of the plurality of tasks is performed in other image forming device, the task distribution unit 160 may determine to execute the job according to the virtual grouping method.

In response to determining to execute the job according to the virtual grouping method, the task distribution unit 160 may determine an image forming device among the plurality of image forming devices in a work group to perform each task in the inputted job. In this case, the task distribution unit 160 may determine the task to be performed by each of the image forming devices 200-1, 200-2, 200-3, considering the operational status and supportable functions of other image forming devices in a virtual group.

For example, in response to a user's control command being a command for the color printing, and the image forming devices 200-1 including no color image forming unit, the task distribution unit 160 may determine to perform the color scanning in the image forming devices 200-1 and perform the color printing in other image forming device in the work group that may perform the color printing.

In this case, the task distribution unit 160 may determine the image forming device with the color image forming unit in the work group as a device for performing the color printing. In response to the work group including a plurality of devices with the color image forming unit, the task distribution unit 160 may determine one other image forming device based on the current availability of the print job of the device (that is, the error status and the number of pending jobs) and a distance to the image forming device 200-1 that performs the scan job. Alternatively, the task distribution unit 160 may determine to execute the print job using all of the plurality of color image forming units.

As described above, the cloud server 100 according to this embodiment performs the virtual grouping with respect to the plurality of image forming devices registered at the user account. Accordingly, the cloud server 100 may execute a job related to the functions that are not supported by the existing image forming device. Further, the cloud server 100 may also execute a job related to the functions that are supported by the image forming device 200-1 by using the image forming devices in the work group, thereby executing the job more rapidly.

So far, in the embodiments of FIGS. 4 and 5, one cloud server 100 performs all of the above-described functions, but in the implementation, the functions may be performed by a plurality of servers.

Further, in the embodiments of FIGS. 4 and 5, the cloud server 100 performs only the virtual grouping job with respect to the plurality of image forming devices, but the cloud server 100 may perform a charging operation with respect to a plurality of users. A detailed description on this operation will be provided below with reference to FIGS. 21 and 22.

Figure 6:
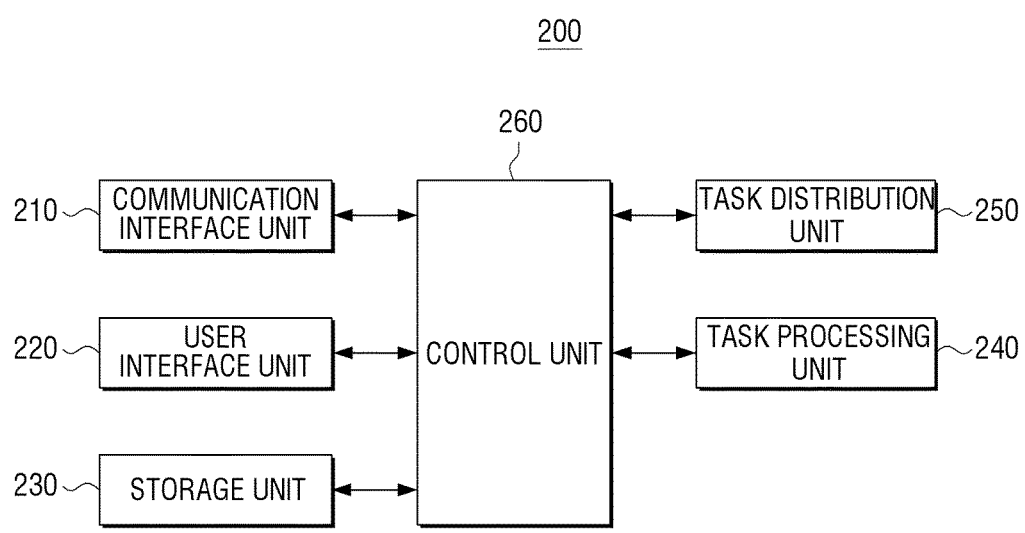
FIG. 6 is a block diagram illustrating a detailed structure of an image forming device according to an embodiment disclosed herein.

FIG. 6 is a block diagram illustrating a detailed structure of an image forming device according to an embodiment disclosed herein.

Referring to FIG. 6, an image forming device 200 may include a communication interface unit 210, a user interface unit 220, a storage unit 230, a task distribution unit 250, a task processing unit 240, and a control unit 260. The image forming device 200 may be one of the image forming devices 200-1, 200-2, 200-3 of FIG. 1. However, for convenience in explanation, the image forming device 200 is referred to as 'current image forming device' that receives a job execute command, and second and third image forming devices 200-2, 200-3 are referred to as 'other image forming device.'

The communication interface unit 210 connects the image forming device 200-1 with an external device. The communication interface unit 210 may be accessed through a Local Area Network (LAN), an internet network, a Universal Serial Bus (USB) port, and a wireless module. In this case, the wireless module may operate according to wireless communication methods, such as, Wireless-Fidelity (Wi-Fi), Wi-Fi Direct, Near Field Communication (NFC), Bluetooth, or the like.

The communication interface unit 210 retrieves the connectable other image forming devices 200-2, 200-3. To be specific, the communication interface unit 210 may retrieve the image forming devices 200-2, 200-3 that may be connected to the image forming devices 200-1 by using a communication method supported by the image forming devices 200-1.

By way of example, in response to the communication interface unit 210 using the Wi-Fi, the communication interface unit 210 may retrieve an image forming device that is connectable according to the Wi-Fi. In response to the communication interface unit 210 supporting the Wi-Fi and the Wi-Fi Direct, the communication interface unit 210 may retrieve an image forming device that is connectable according to each communication method.

The communication interface unit 210 receives device information on the retrieved other image forming devices 200-2, 200-3. To be specific, the communication interface unit 210 may receive the information on the connectable other image forming device around the first image forming device 200-1 or receive the information on other image forming device selected by the user.

In this case, the device information may include a device name of an image forming device, address information (IP address, MAC information, or the like, that is, information necessary for connection with respect to the image forming device), function information (information on the functions supported by the image forming device, for example, information on availability of the color print function or the scanning function), and status information (the current job availability, an error status, a job progress status, or the like).

The communication interface unit 210 transmits the device information to the cloud server 100, the mobile device 300, or other image forming devices 200-2, 200-3. To be specific, in response to receiving an NFC tag from the mobile device 300, the communication interface unit 210 may transmit its own device information to the mobile device 300.

The communication interface unit 210 transmits a UI for controlling the functions of the image forming device 200-1 to the mobile device 300. To be specific, the mobile device 300 according to this embodiment may display a UI according to two methods. According to the first method, the mobile device 300 may receive the device information and then configure and display a UI autonomously based on the received device information. According to the second method, the mobile device 300 may receive a UI from the image forming device directly and display the UI.

Accordingly, in response to the mobile device 300 operating in the second method, and the mobile device 300 directly being connected to the image forming device 200-1, not the cloud server 100, the communication interface unit 210 may provide the mobile device 300 with the UI. As the image forming device is included in a work group, the image forming device may use the functions of other image forming devices, and the communication interface unit 210 may provide the mobile device 300 with a UI for receiving control with respect to the functions of other image forming devices.

The communication interface unit 210 receives a job execute command. In this case, the received job execute command may be a command for a virtual grouping job that needs to be executed in a plurality of image forming devices. The virtual grouping job may be transmitted according to two methods. According to the first method, control commands related to the virtual grouping job with respect to the image forming device 200-1 and other image forming device 200-2 are received in batches.

According to the second method, the tasks of the virtual grouping job are transmitted to the individual image forming devices, respectively. In this case, the communication interface unit 210 may receive only a control command corresponding to a part of the virtual grouping job to be executed in the communication interface unit 210.

In response to receiving the virtual grouping job according to the first method, the communication interface unit 210 transmits the other of the virtual grouping job that was not performed in the task processing unit 240 to other image forming devices 200-2, 200-3 in the work group. To be specific, in executing the virtual grouping job, the communication interface unit 210 may transmit the job to be executed in other image forming devices 200-2, 200-3 to other image forming devices 200-2, 200-3. In this case, the communication interface unit 210 may transmit the job to be distributed to the image forming devices 200-2, 200-3 determined by a task distribution unit 250. The image forming devices may be one other image forming device or a plurality of other image forming devices. A detailed description on the task distribution unit 250 will be provided below.

The communication interface unit 210 receives a part of the job related to the job execute command received from other image forming device, from other image forming device in the work group. The received job may be transmitted to the task processing unit 240 and then processed.

The communication interface unit 210 may transmit its own status information or the progress status related to the received job to other image forming device that transmitted the job.

The communication interface unit 210 may receive the information on the plurality of image forming devices selected in the mobile device 300 from the mobile device 300. In this case, the information on the plurality of image forming devices selected by the mobile device 300 may be information on an image forming device that was tagged with the mobile device 300, that is, information generated while the mobile device 300 generates a workform.

The communication interface unit 210 receives work group information from the cloud server 100. To be specific, the communication interface unit 210 may receive information on the work group including the current image forming device through the cloud server 100. The work group may be generated in the cloud server 100.

The communication interface unit 210 receives print data. In this case, the print data may be data of a printer language, such as, Postscript (PS), Printer Control Language (PCL), or the like. In response to the image forming device 200-1 supporting direct printing, the print data may be a file itself in a format of PDF, XPS, BMP, JPG, or the like.

The user interface unit 220 may include a plurality of function keys that enables the user to configure or select diverse functions supported by the image forming device 200-1 and display various information provided by the image forming device 200-1. The user interface unit 220 may be realized as a device that performs an input and an output simultaneously, such as, a touch screen or may be realized by combining a manipulation input unit, such as, a mouse, a keyboard, or the like, with a display unit, such as, a monitor, or the like.

The user interface unit 220 may display a list of the plurality of the plurality of other connectable image forming devices 200-2, 200-3. To be specific, the user interface unit 220 may display a list of the image forming devices retrieved in the communication interface unit 210. In this case, the user interface unit 220 may display the information on each device along with the list. In this case, the displayed device information may include the functions, the locations, or the device names or the image forming device. The user may select the plurality of image forming devices through the list displayed in the user interface unit 220 and generate a work group.

The user interface unit 220 displays a UI for controlling the functions of the image forming device 200-1. The user may input a control command for controlling the functions of the image forming device 200-1 through the displayed UI. In this case, the user interface unit 220 may receive a selection of a copy function, a fax function, a scan-to-email function, a scan-to-server function, or a device configuration change function and options for the functions that may be performed in the image forming device 200-1 through the displayed UI. Meanwhile, in the above embodiment, only the selection of the copy function, the fax function, the scan-to-email function, the scan-to-server function, or the device configuration change function were described as the examples of the functions of the image forming device 200-1. However, in the implementation, any other functions supported by the image forming device may be applied.

In this case, the user may input only one function or input a plurality of functions. In other words, the user interface unit 220 may receive a job execute command for a job using a plurality of functions. In this case, the job using a plurality of functions may include a function that is not supported by the current image forming device 200-1.

Figure 21:
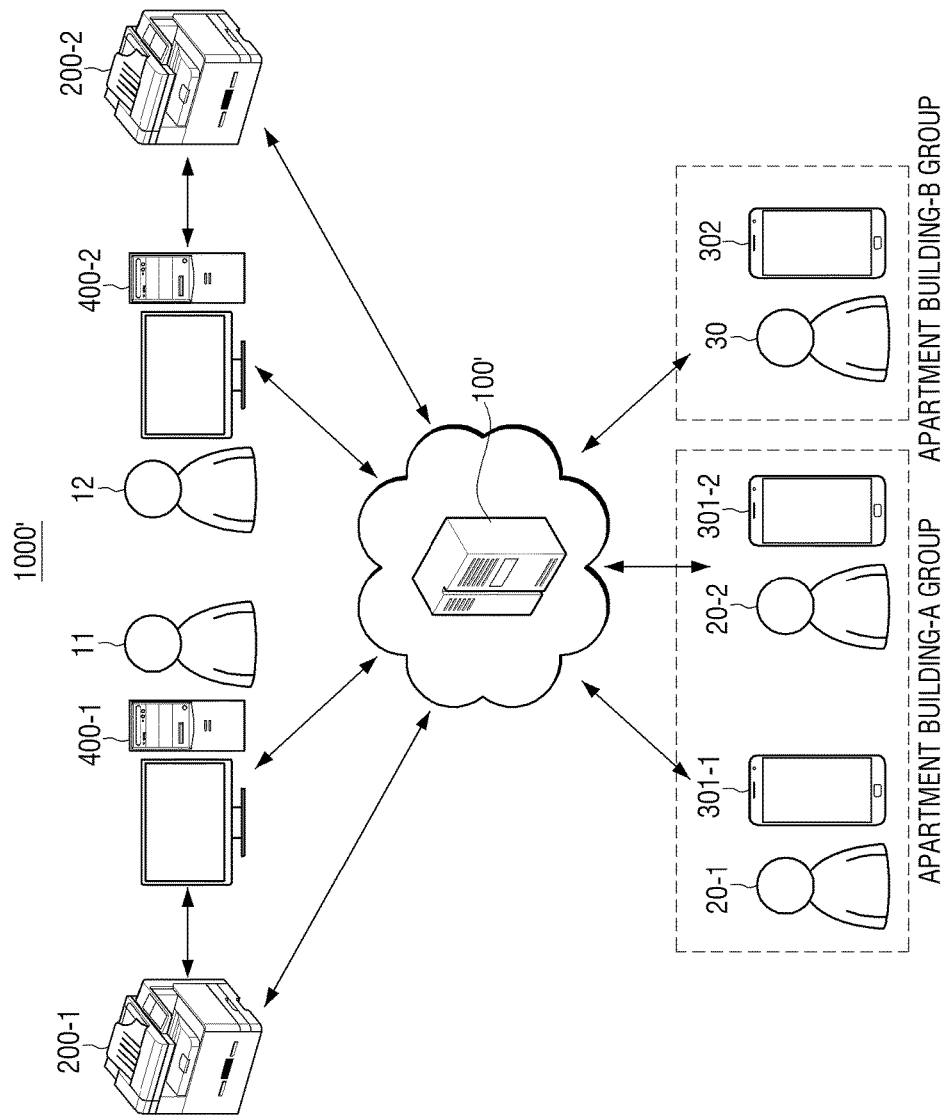
FIG. 21 is a diagram provided to describe an image forming system according to another embodiment disclosed herein.

To be specific, the user interface unit 220 may receive the functions that may be performed through the combination of the image forming device 200-1 and other image forming devices 200-2, 200-3 and options of the functions through the displayed UI. To be specific, in response to the virtual grouping job being available as the image forming device 200-1 is included in the work group 200-1, 200-2, 200-3, the user interface unit 220 may display a UI for receiving a job that is executable using the functions of other image forming devices 200-2, 200-3 in the work group. For example, as illustrated in FIGS. 21 and 22, in response to the first image forming device 200-1 that does not support the color copy function being included in the work group including the third image forming device 200-3 that supports the color printing function, the first image forming device 200-1 may display a color copy option that was not displayed before.

The user interface unit 220 may receive a selection of other image forming devices 200-2, 200-3 to execute the current job in combination with the image forming device 200-1. To be specific, in responses to the plurality of image forming devices 200-2, 200-3 for performing the virtual grouping job being provided, the user interface unit 220 may receive a selection of at least one of the plurality of devices in the work group.

The user interface unit 220 displays a job execution result of the received job. To be specific, in response to the job received from the user being the virtual grouping job, the user interface unit 220 may display a job execution result of other image forming devices 200-2, 200-3 along with the job execution result of the current image forming device 200-1.

Further, the user interface unit 220 may display the information on other image forming devices 200-2, 200-3 that execute the virtual grouping job. To be specific, the user interface unit 220 may inform a user of the device names or the locations of other image forming devices 200-2, 200-3 that execute the virtual grouping job. In the implementation, the user interface unit 220 may be realized so as to display the information through the printout or display the information in the mobile device that transmitted the job execute command.

In response to an error occurring in the image forming device 200-2 that executes the virtual grouping job, the user interface unit 220 may display information on the error status. Further, the user interface unit 220 may display a list of other image forming device 200-3 that may execute the job instead of the image forming device 200-2 where the error occurred. Accordingly, the user may select other image forming device in the list and resume the job.

The storage unit 230 stores the generated work group. To be specific, the storage unit 230 may store the work group generated in the control unit 260 or receive and store the work group generated in the cloud server 100. In this case, the storage unit 230 may store the device information on the image forming devices in the work group along with the work group.

The storage unit 230 may temporarily store job data transmitted from other image forming devices (documents, print data, scan data, or the like).

Further, the storage unit 230 may be realized as a storage medium in the image forming device 200-1 or an external storage medium, for example, a removable disk including a USB memory, a web server through a network, or the like.

The task distribution unit 250 determines whether to execute an inputted job according to the general method or according to the virtual grouping method. To be specific, in response to an inputted job execute command including a function that is not supported by the image forming devices 200-1, the task distribution unit 160 may determine to execute the job according to the virtual grouping method.

In response to the inputted job execute command being a command using a plurality of tasks, and a job processing speed increasing when a part of the plurality of tasks is performed in other image forming device, the task distribution unit 250 may determine to execute the job according to the virtual grouping method.

In response to determining to execute the job according to the virtual grouping method, the task distribution unit 250 may determine an image forming device to perform each task in the inputted job. In this case, the task distribution unit 250 may determine the task to be performed in each of the image forming devices 200-1, 200-2, 200-3, considering the operational status and supportable functions of other image forming devices in a virtual group.

For example, in response to a user's control command being a command for the color printing, and the image forming devices 200-1 including no color image forming unit, the task distribution unit 250 may determine to perform the color scanning in the image forming devices 200-1 and perform the color printing in other image forming device in the work group that may perform the color printing.

In this case, the task distribution unit 250 may determine the image forming device with the color image forming unit in the work group as a device for performing the color printing. In response to the work group including a plurality of devices with the color image forming unit, the task distribution unit 250 may determine one other image forming device based on the current availability of the print job of the device (that is, the error status and the number of pending jobs) and the distance to the image forming device 200-1 that performs the scan job. Alternatively, the task distribution unit 250 may determine to execute the print job using all of the plurality of color image forming units.

The task processing unit 240 (task component) performs a predetermined function. To be specific, the task processing unit 240 may include an image forming unit for outputting the print data (or scan data). In response to the image forming device 200-1 supporting the fax task, such as, a fax sending task, a fax receiving task, or the like, the task processing unit 240 may include a facsimile unit for performing the fax task. Further, in response to the image forming device 200-1 supporting the scan task, the task processing unit 240 may include a scanning unit for performing the scan task. In response to the image forming device 200-1 being realized as an MFP capable of performing the above functions in one device, the task processing unit 240 may include the image forming unit, the facsimile unit, a scanning unit, or the like. Further, the task processing unit 240 may further include an image processor for converting a file format of an image (for example, converting a scan image to file in Portable Document Format (PDF) or an e-book format), or the like. The task processing unit 240 may further include an e-mail transmission unit or a server transmission unit for transmitting the generated data to a particular device.

The task processing unit 240 executes a part of the job by performing at least one task among the plurality of tasks corresponding to the job. To be specific, the task processing unit 240 may execute a part of the job distributed in the task distribution unit 250.

The task processing unit 240 may execute the job received from the image forming devices 200-2, 200-3 through the communication interface unit 210 (that is, the other of the job that was not performed in other image forming devices). To be specific, in response to the job execute command being received from the image forming devices 200-2, 200-3, the task processing unit 240 may execute the job transmitted from the image forming devices 200-2, 200-3.

The control unit 260 controls overall components of the image forming device 200-1. Particularly, the control unit 260 generates a work group including the image forming device 200-1 and other image forming devices 200-2, 200-3. More particularly, the control unit 260 retrieves connectable image forming devices 200-2, 200-3 and group the plurality of retrieved image forming devices 200-2, 200-3 as a work group in various methods.

The control unit 260 may group all of the connectable image forming devices 200-1, 200-2, 200-3 as one work group, and this method may be applied when there are a few number of image forming devices. That is, when there are dozens of image forming devices connectable to the image forming device 200-1, it may be difficult to check the status of each of the plurality of image forming devices and collect the printout from the devices. Accordingly, it is desirable to include several image forming devices in a work group.

Hereinafter, a method for generating a work group with an appropriate number of devices will be described.

The control unit 260 may control the user interface unit 220 to display a list of the plurality of other connectable image forming devices 200-2, 200-3 and generate the image forming devices selected from the displayed list as a work group. In the above embodiment, the control unit 260 receives a selection of the image forming devices to be included in the work group from the user after the list of the connectable image forming devices is displayed. However, in the implementation, the control unit 260 may receive the information on other image forming devices to be included in the work group. For example, in response to receiving the information for specifying an image forming device, such as, an IP address, a device name, an any # phone number (a phone number assigned to the image forming device for executing a cloud print job) of other image forming device, the control unit 260 may add the image forming device corresponding the received information to the work group. This embodiment will be described below in further detail with reference to FIG. 11.

Further, in the above embodiment, the control unit 260 displays all of the retrieved image forming devices, but in the implementation, the control unit 260 may display a list of only an image forming device that satisfies a predetermined condition by applying one of the following methods. For example, the control unit 260 may display a list of only an image forming device with an address of the same subnet as the image forming device 200-1.

Further, the control unit 260 may receive the information on the plurality of image forming devices selected in the mobile device 300 and generate a work group based on the received information. In this case, the information on the plurality of image forming devices may be information on an image forming device which is NFC-tagged with the mobile device 300. This embodiment will be described below in further detail with reference to FIG. 9. Meanwhile, in the above embodiment, the control unit 260 receives the information on the plurality of image forming devices from only the mobile device, but in the implementation, the control unit 260 may receive the information from other image forming devices or from a management server, not the mobile device. In this case, the management server may be an Any# server that supports the cloud print function based on a phone number. This embodiment will be described below in further detail with reference to FIGS. 9, 10, and 12.

Further, the control unit 260 may retrieve the connectable image forming devices through the LAN and generate the image forming devices as a work group. In this case, the LAN may be Bluetooth. Meanwhile, in the above embodiment, only the Bluetooth was described as an example of the communication method, but in the implementation, other short-range wireless network methods may be used. This embodiment will be described below in detail with reference to FIG. 13.

The control unit 260 may acquire the device names of other connectable image forming devices 200-2, 200-3 and generate a work group including the image forming devices with an identifier which is the same as an identifier of the image forming device 200-1. This embodiment will be described below in further detail with reference to FIG. 14.

The control unit 260 may acquire the address information including the IP addresses of other connectable image forming devices 200-2, 200-3 and generate a work group comparing the acquired address information with the address information on the image forming device 200-1. That is, the control unit 260 may generate the image forming devices in the same subnet as a work group. In this case, the control unit 260 may exclude other image forming devices 200-2, 200-3 with a predetermined hop count and other image forming devices 200-2, 200-3 with the Subsystem Identification (SSID) information different from the SSID of the image forming device 200-1 from the work group. This embodiment will be described below in further detail with reference to FIG. 15.

The above-described methods for generating a work group may be integrated in series and/or in parallel. As an example, in response to the methods being integrated in series, the control unit 260 may generate only the devices that may perform the mutual LAN communication among the image forming device in the same subnet as a work group by combining the method using the IP address and the method using the LAN.

As another example, in response to the methods being integrated in parallel, the control unit 260 may generate the NFC-tagged image forming device 200-2 as a first work group 200-1, 200-2 and generate the image forming device 200-3 that may perform the LAN communication as a second work group 200-1, 200-3. In response to a plurality of work groups being generated, and a job execute command for the virtual grouping job being received from the user, the control unit 260 may receive a selection of a work group for executing the job.

Further, according to the above-described methods, a work group may be generated automatically and/or manually. For example, the NFC-tagged image forming devices may be generated as a work group automatically, but in the implementation, a work group may be generated by displaying a list of the tagged image forming devices and receiving a selection of the devices to be generated as the work group among the devices in the displayed list from the user.

The control unit 260 may generate a work group by considering the functions supported by the image forming devices 200-1, 200-2, 200-3. By way of example, the control unit 260 may control the image forming devices such that the image forming devices that may support the general functions, such as, the print task, are grouped in a limited manner by using the above-described grouping method. Further, the control unit 260 may control the image forming devices such that the image forming devices that may perform the infrequently-used tasks, such as, the color print task, the fax sending task job, and the e-book generating task, are included in the work group without limitation.

That is, the control unit 260 may generate the work group in a form where the devices in the work group may perform diverse functions. For instance, in response to the plurality of retrieved image forming devices including one device with the fax sending function, the control unit 260 may control the image forming device to be included in the work group by default.

In the above embodiment, the image forming device 200-1 generates a work group. In this case, the entire image forming devices 200-1, 200-2, 200-3 in the system may generate the work group individually. Alternatively, only a certain image forming device in the system may generate the work group. The certain image forming device may be a device that is capable of performing more diverse functions than other devices or may be the latest-model device.

Further, in response to receiving the job execute command from the user, the control unit 260 may determine whether the received job execute command is a command using the virtual grouping method. In response to determining that the received job execute command is a command using the virtual grouping method, the control unit 260 may control the task distribution unit 250 to determine an image forming device to execute the job, a task to be performed in the device, and the workload. Further, the control unit 260 may control the task processing unit 240 and the communication interface unit 210 such that the job is executed according to the distributed task.

In response to a predetermined condition being satisfied, the control unit 260 may generate a work group. In this case, the predetermined condition may include a power-on operation of an image forming device, variation of the connectable image forming devices, a periodical time, a user request, receiving the information on the work group from the cloud server 100 or the mobile device 300, or the like.

In response to the image forming device 200-1 being included in the work group where the virtual grouping job is available, the control unit 260 may determine whether there is a task that may be additionally performed by the virtual grouping and control the user interface unit 220 to display a changed UI for receiving a selection of the additional task.

As described above, the image forming devices 200-1 according to this embodiment forms a work group with the plurality of other connectable image forming devices. Accordingly, the image forming devices 200-1 may execute a job related to the functions that are not supported by the image forming device 200-1. Further, the image forming devices 200-1 may also execute a job related to the functions that are supported by the image forming device 200 by using other image forming devices in the work group, thereby executing the job more rapidly.

Further, in the embodiment of FIG. 6, the image forming device executes the virtual grouping job in combination with other image forming devices, but the image forming device may provide the cloud server with information for a charging operation with respect to a user. This embodiment will be described below in further detail with reference to FIG. 24.

Figure 7:
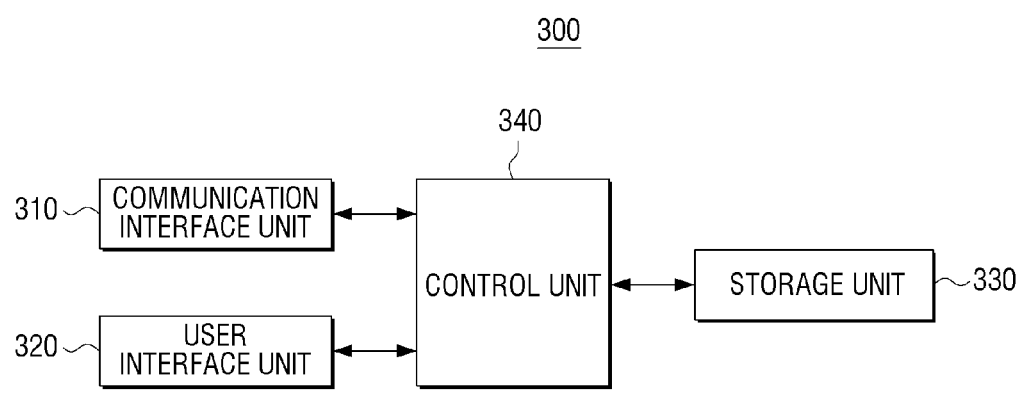
FIG. 7 is a block diagram illustrating a detailed structure of a mobile device according to an embodiment disclosed herein.

FIG. 7 is a block diagram illustrating a detailed structure of a mobile device according to an embodiment disclosed herein.

Referring to FIG. 7, a mobile device 300 according to an embodiment may include a communication interface unit 310, a user interface unit 320, a storage unit 330, and a control unit 340.

The communication interface unit 310 connects the image the mobile device 300 with an external device. The communication interface unit 310 may be accessed through a Local Area Network (LAN), an internet network, a Universal Serial Bus (USB) port, and a wireless module. In this case, the wireless module may operate according to wireless communication methods, such as, Wireless-Fidelity (Wi-Fi), Wi-Fi Direct, Near Field Communication (NFC), Bluetooth, Infrared Rays (IR), or the like.

The communication interface unit 310 receives a UI from a cloud server 100. To be specific, in response to a user accessing a webpage corresponding to the cloud server 100, the communication interface unit 310 may receive a UI realized as a webpage. In this case, the received UI may be a UI for receiving a user account.

The communication interface unit 310 transmits user information to the cloud server 100. In this case, the user information is user account information for accessing the cloud server 100 and may include the ID and password.

The communication interface unit 310 may transmit information on an image forming device to be added to the user account to the cloud server 100. In this case, the information on an image forming device to be added may be information for specifying an image forming device tagged by the mobile device 300 and an image forming device selected by the user through the user interface unit 320 (the IP address, the phone number, or the like.)

The communication interface unit 310 may retrieve image forming devices 200-1, 200-2, 200-3 that are connectable to the mobile device directly by using the communication method supported by the mobile device 300. By way of example, in response to the communication interface unit 310 using the Wi-Fi, the communication interface unit 310 may retrieve an image forming device that is connectable according to the Wi-Fi. In response to the communication interface unit 310 supporting the Wi-Fi and the NFC, the communication interface unit 310 may retrieve an image forming device that is connectable according to each communication method.

The communication interface unit 310 receives device information on the retrieved or selected image forming devices. To be specific, the communication interface unit 310 may receive information on the connectable image forming devices or information on the image forming device selected by the user. In this case, the device information may include address information (IP address, MAC information, or the like, that is, information necessary for connection with respect to the image forming device), function information (information on the functions supported by the image forming device, for example, information on availability of the color print function or the scanning function), and status information (the current job availability, an error status, a job progress status, or the like) on an image forming device.

In the above embodiment, the device information is received after an image forming device is retrieved or selected, but in the implementation, the operation of selecting an image forming device and the operation of receiving information may be performed simultaneously. For example, in response to the communication interface unit 310 supporting the NFC communication, the user may select an image forming device according to an NFC tag method, and the device information on the image forming device may be received in response to a user tag operation.

The communication interface unit 310 receives a UI for controlling the functions of the image forming devices 200-1, 200-2, 200-3. To be specific, in response to the mobile device 300 controlling the image forming devices through the cloud server 100, the communication interface unit 310 may receive the UI from the cloud server 100. In response to the mobile device 300 directly being connected to the image forming devices 200-1, 200-2, 200-3, the communication interface unit 310 may receive the UI from the respective image forming devices.

The communication interface unit 310 transmits a control command to the image forming device 200-1. To be specific, when the mobile device 300 may be directly connected to the image forming device 200-1, the communication interface unit 310 may transmit the control command received through the UI to the image forming device 200-1. When the mobile device 300 may be not connected to the image forming device 200-1 directly, the mobile device 300 may transmit a job execute command to the cloud server 100.

The communication interface unit 310 transmits the print data. To be specific, in response to a user's control command being a print command or a fax send command for a document in the mobile device 300, the communication interface unit 310 may transmit the print data to the image forming device 200-1 directly or via the cloud server 100. In this case, the print data may be data of a printer language, such as, Postscript (PS), Printer Control Language (PCL), or the like. In response to the image forming device 200 supporting direct printing, the print data may be a file itself in a format of PDF, XPS, BMP, JPG, or the like.

The communication interface unit 310 receives information on the progress status of the requested job. To be specific, the communication interface unit 310 may receive the progress status of the requested job from the cloud server 100 or from the image forming device 200-1 that performs the job.

The communication interface unit 310 may transmit the information on the work group to the image forming device 200-1 or to the cloud server 100. To be specific, the communication interface unit 310 may transmit the information on the work group of the plurality of image forming devices generated in the mobile device 300 to the image forming devices in the work group or to the cloud server 100.

The user interface unit 320 may include a plurality of function keys that enables the user to configure or select diverse functions supported by the mobile device 300 and display various information provided by the mobile device 300. The user interface unit 320 may be realized as a device that performs an input and an output simultaneously, such as, a touch screen, or may be realized by combining a mouse and a monitor.

The user interface unit 320 may receive an application execute command. To be specific, the user may execute an application installed in the mobile device 300 or input an application execute command for a web browser application for accessing a certain webpage in order to execute a job with respect to the image forming device.

The user interface unit 320 may display a UI for accessing the cloud server 100 and receive the user account information from the user.

The user interface unit 320 may receive the information on the image forming devices to be registered at the user account. In this case, the user may input an IP address or a phone number of the image forming devices.

The user interface unit 320 may receive a selection of an image forming device to be included in a work group from among the image forming devices to be registered at the user account.

The user interface unit 320 displays a UI for controlling the functions of the image forming device 200-1. To be specific, the user interface unit 320 may display a UI transmitted through the communication interface unit 210. Further, the user interface unit 320 may generate and display a UI autonomously based on the device information received through the communication interface unit 210. The user may input a control command for controlling the functions of the image forming device 200 through the displayed UI.

In this case, the user interface unit 320 may receive a selection of a copy function, a fax function, a scan-to-email function, a scan-to-server function, or a device configuration change function and options for the functions that may be performed in the image forming device 200-1 through the displayed UI. Meanwhile, in the above embodiment, only the selection of the copy function, the fax function, the scan-to-email function, the scan-to-server function, or the device configuration change function were described as the examples of the functions of the image forming device 200-1. However, in the implementation, any other functions supported by the image forming device may be applied.

In this case, the user may input only one function or input a plurality of functions. In other words, the user interface unit 320 may receive a job execute command for a job using a plurality of functions. For example, the user interface unit 320 may receive a first task to be performed in the first image forming device 200-1 and a second task (a task different from the first task) to be performed in the second image forming device. In this case, the job using a plurality of functions may include a task that is not supported by the current image forming device 200-1.

To be specific, the user interface unit 320 may receive the tasks that may be performed through the combination of the image forming device 200-1 and other image forming devices 200-2, 200-3 and options of the tasks through the displayed UI. To be specific, in response to the virtual grouping job being available as the image forming device 200-1 is included in the work group 200-1, 200-2, 200-3, the user interface unit 320 may display a UI for receiving a job that is executable using the tasks of other image forming devices in the work group. For example, as illustrated in FIGS. 21 and 22, in response to the first image forming device 200-1 that does not support the color copy function being included in the work group including the third image forming device 200-3 that supports the color printing function, the first image forming device 200-1 may display a color copy option that was not displayed before.

The user interface unit 320 may display the progress status of the job corresponding to the received job execute command. For example, in response to the job including a plurality of tasks, the progress status of each task may be displayed on a percentage basis. In response to the received job execute command being a command for the virtual grouping job executed in the plurality of image forming devices, the user interface unit 320 may display a job status of each of the image forming devices.

The user interface unit 320 may display location information on the image forming device that is executing the job. This display operation may be performed when the job includes the print task and the user needs to collect the printout.

The user interface unit 320 receives a selection of the image forming devices to be included in the work group. To be specific, the user interface unit 320 may display the connectable image forming devices or the NFC-tagged image forming devices and may receive a selection of the image forming devices to be included in the work group from among the image forming devices. In this case, the user interface unit 320 may display the task of each image forming device to be of help to generate the work group.

The storage unit 330 stores a UI. To be specific, the storage unit 230 may store the UI received through the communication interface unit 310. Further, the storage unit 330 stores phone number information assigned to the mobile device.

The storage unit 330 stores the generated work group. To be specific, the storage unit 330 may store the work group generated in the control unit 340. In this case, the storage unit 330 may store the device information on the image forming devices in the work group along with the work group.

Further, the storage unit 330 may be realized as a storage medium in the cloud server 100 or an external storage medium, for example, a removable disk including a USB memory, a web server through a network, or the like.

The control unit 340 controls overall components of the mobile device 300. To be specific, in response to receiving an application execute command with respect to an application for controlling the image forming device from the user, the control unit 340 may control the user interface unit 320 to display the UI for controlling execution of the image forming device.

Further, the control unit 340 may receive account information from the user and control the communication interface unit 310 and the user interface unit 320 such that the information on the image forming device corresponding to the received account information is received and displayed from the cloud server 100.

In response to receiving the job execute command with respect to the image forming device 200 from the user, the control unit 340 may control the communication interface unit 310 to execute the received job execute command.

The control unit 340 may generate the work group using the device information on the image forming device selected by the user. To be specific, the control unit 340 may control the communication interface unit 310 to collect the information on the plurality of connectable image forming devices and generate the work group including the plurality of image forming devices based on the received information. The operation of generating the work group may be performed automatically and/or manually. The detailed description on the method for generating a work group was provided above in connection with the method in the image forming device or the cloud server, and thus, a repeated description will be omitted.

As described above, the mobile device 300 according to this embodiment receive the control with respect to the image forming devices by using the UI where the tasks of the plurality of image forming devices 200-1, 200-2, 200-3 are combined, thereby extending the functions that are not supported by each image forming device 200 and executing the job more rapidly.

Figure 8:
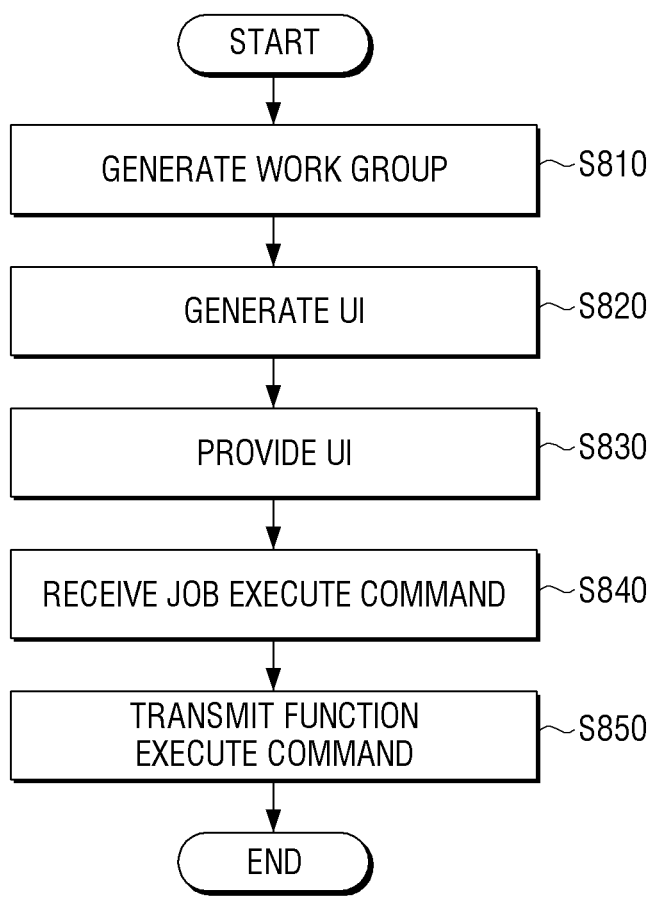
FIG. 8 is a flowchart provided to describe a printing control method in a cloud server according to an embodiment disclosed herein.

FIG. 8 is a flowchart provided to describe a printing control method in a cloud server according to an embodiment disclosed herein.

A work group including a plurality of image forming devices controlled by a mobile device is generated (S810). The work group may be generated in diverse forms, and a detailed description on the operation will be provided below with reference to FIGS. 9 to 15.

A User Interface (UI) for receiving a virtual grouping job coupled to a plurality of tasks supported by the plurality of image forming devices is generated (S820). To be specific, a UI for receiving an input of a combination of the executable tasks of the respective image forming devices registered to correspond to a user may be generated in a form of a webpage. For example, in response to a first image forming device supporting only a print task, and a second image forming device supporting only a scan task, a UI for receiving the print task, the scan task, and a copy task (print+scan) may be generated.

The generated UI is provided to a mobile device (S830), and a job execute command is received through the provided UI (S840).

A control command corresponding to the received job execute command is transmitted to the image forming devices (S850). To be specific, a command for allowing the first image forming device of the plurality of image forming devices to execute a part of the virtual grouping job by processing at least one task among the plurality of tasks corresponding to the virtual grouping job and allowing the second image forming device of the plurality of image forming devices to execute the other of the virtual grouping job that was not performed by the first image forming device and a control command related to the virtual grouping job with respect to the first and second image forming devices may be transmitted to the first image forming device in batches. Further, a control command for allowing the first image forming device to execute a part of the virtual grouping job may be transmitted to the first image forming device, and a control command for allowing the second image forming device to execute the other of the virtual grouping job may be transmitted to the second image forming device.

As described above, according to the print control method of this embodiment, the plurality of image forming devices registered at the user account are generated as a work group. Accordingly, a job related to the functions that are not supported by the respective image forming device 200 may be executed. Further, according to the print control method of this embodiment, the job related to the functions that are supported by the image forming device 200 may be executed by combining the image forming devices in the work group. Accordingly, the job may be executed more rapidly. The print control method of FIG. 8 may be executed in a cloud server with the structure of FIG. 4 or the structure of FIG. 5 or may be executed in a cloud server with any other structures.

The above-described print control method may be realized as a program with an executable algorithm that may be executed in a computer, and the program may be stored and provided in a non-transitory computer readable medium.

The non-transitory computer readable medium refers to a medium that stores data permanently or semi-permanently unlike a register, a cache, or a memory that stores data for a short time, and is readable by an apparatus. Particularly, the above-described various applications and programs may be stored in and provided through the non-transitory computer readable medium, such as, a Compact Disc (CD), a Digital Versatile Disk (DVD), a hard disk, a Blu-ray disk, a Universal Serial Bus (USB), a memory card, a Read-Only Memory (ROM), or the like.

Figure 9:
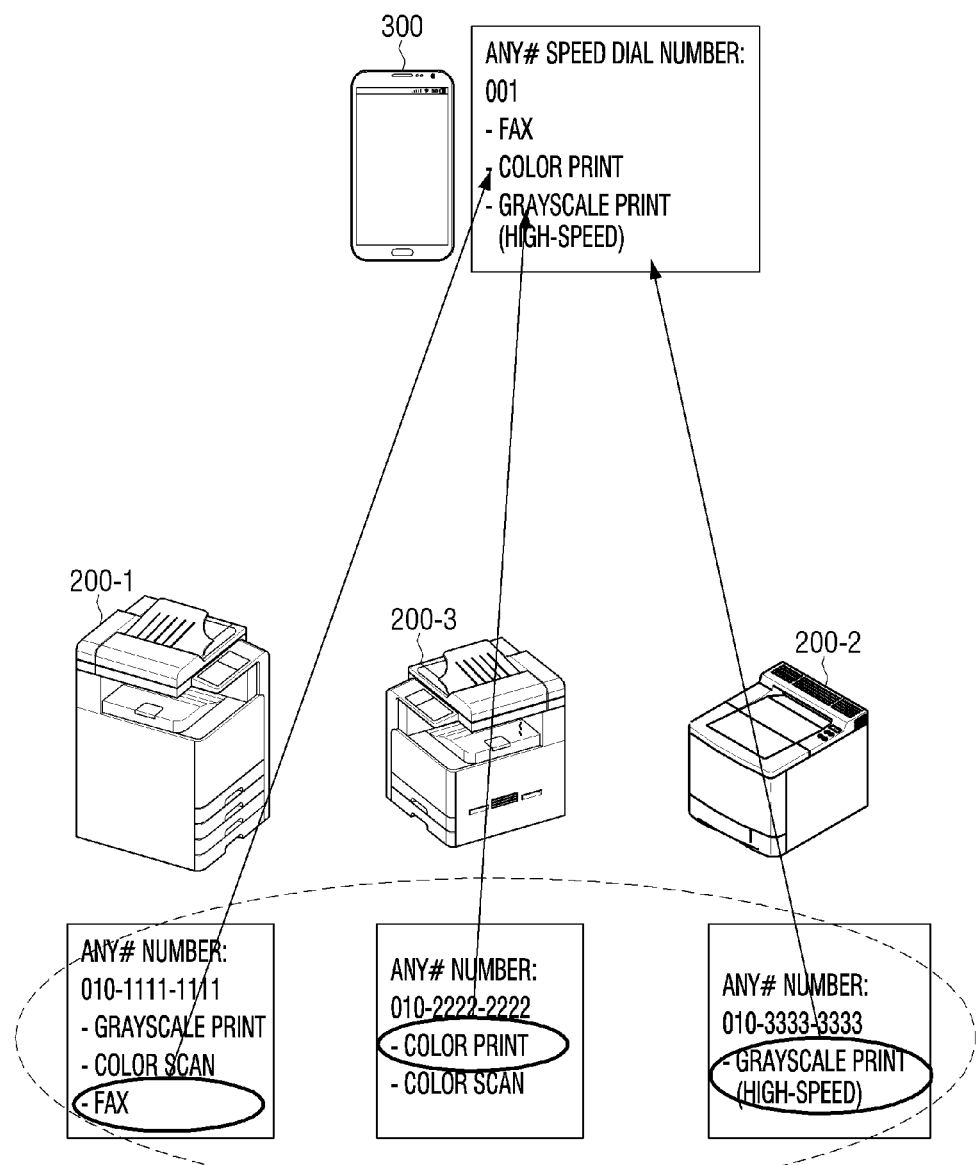
FIG. 9 is a diagram provided to describe a grouping method according to the first embodiment disclosed herein.

FIG. 9 is a diagram provided to describe a grouping method according to the first embodiment disclosed herein.

Referring to FIG. 9, a mobile device 300 receives a phone number of an image forming device to be registered at a user account. In this case, a user may receive an input of a function of the image forming device to be registered along with the phone number of the image forming device.

The mobile device 300 may transmit the received phone number and information on the function to a cloud server 100, and the cloud server 100 may register tasks that the user may select at the user account. Accordingly, the cloud server 100 may generate a work group based on the received phone number and the function information.

For example, when a first image forming device 200-1 supports a grayscale print function, a color scan function, and a fax function as illustrated, and the user inputs the phone number and the fax function of the first image forming device 200-1, a fax task is registered at the user account. When the user inputs the phone number and a color print function of a second image forming device, a color print task is registered at the user account. When the user inputs the phone number and the grayscale print function (high-speed) of a third image forming device, the cloud server 100 may generate three tasks of the three image forming devices as a work group. Further, the cloud server 100 may generate a UI for receiving a selection of the three tasks of the three image forming devices and provide the mobile device 300 with the generated UI.

As described above, according to the grouping method of the first embodiment, the user may input the phone number of the image forming device to be added to the work group in the mobile device, thereby easily generating the work group without inconvenient configuration operation.

Figure 10:
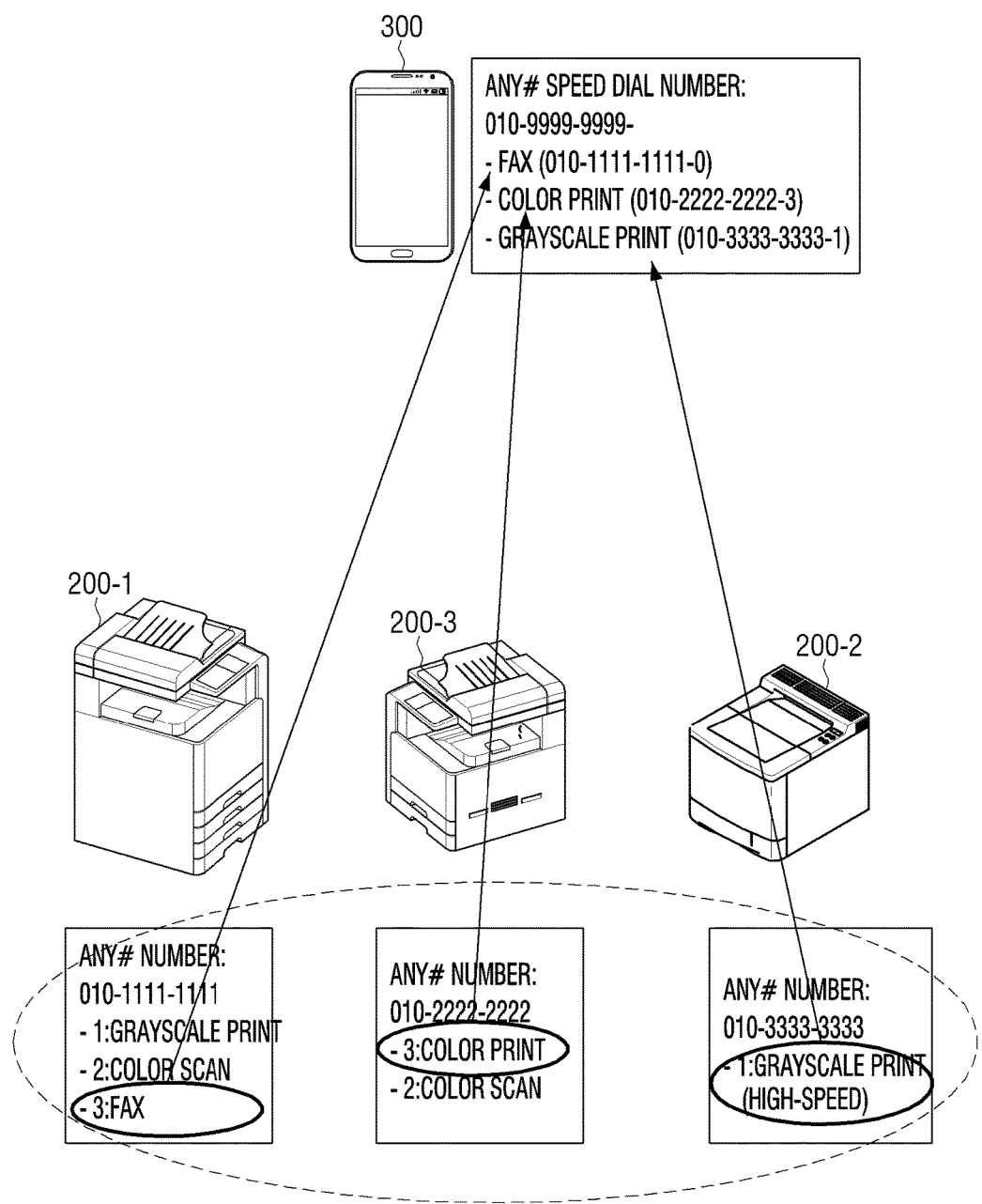
FIG. 10 is a diagram provided to describe a grouping method according to the second embodiment disclosed herein.

FIG. 10 is a diagram provided to describe a grouping method according to the second embodiment disclosed herein.

Referring to FIG. 10, a mobile device 300 receives a phone number of an image forming device to be registered at a user account. In this case, a user may receive an input of a function of the image forming device to be registered as a function number along with the phone number.

For example, when a first image forming device 200-1 supports a grayscale print function, a color scan function, and a fax function as illustrated, and a user inputs '010-1111-1111-3' that is a combination of the phone number of the first image forming device 200-1 and an identification number '3' corresponding to a fax task, the fax task may be added to the work group. When a second image forming device 200-2 supports a color print function and a color scan function, the user inputs '010-222-2222-3' that is a combination of the phone number of the second image forming device 200-2 and a function number '3' corresponding to the color print task, the color print task may be added to the work group. Further, when a third image forming device 200-3 supports a high-speed grayscale print function, and the user inputs '010-3333-3333-1' that is a combination of the phone number of the third image forming device 200-3 and a function number '1' corresponding to the high-speed grayscale print function, a high-speed grayscale print task may be added to the work group.

As described above, according to the grouping method of the second embodiment, the user may input the phone number of the image forming device to be added to the work group in the mobile device, thereby easily generating the work group without inconvenient configuration operation.

Figure 11:
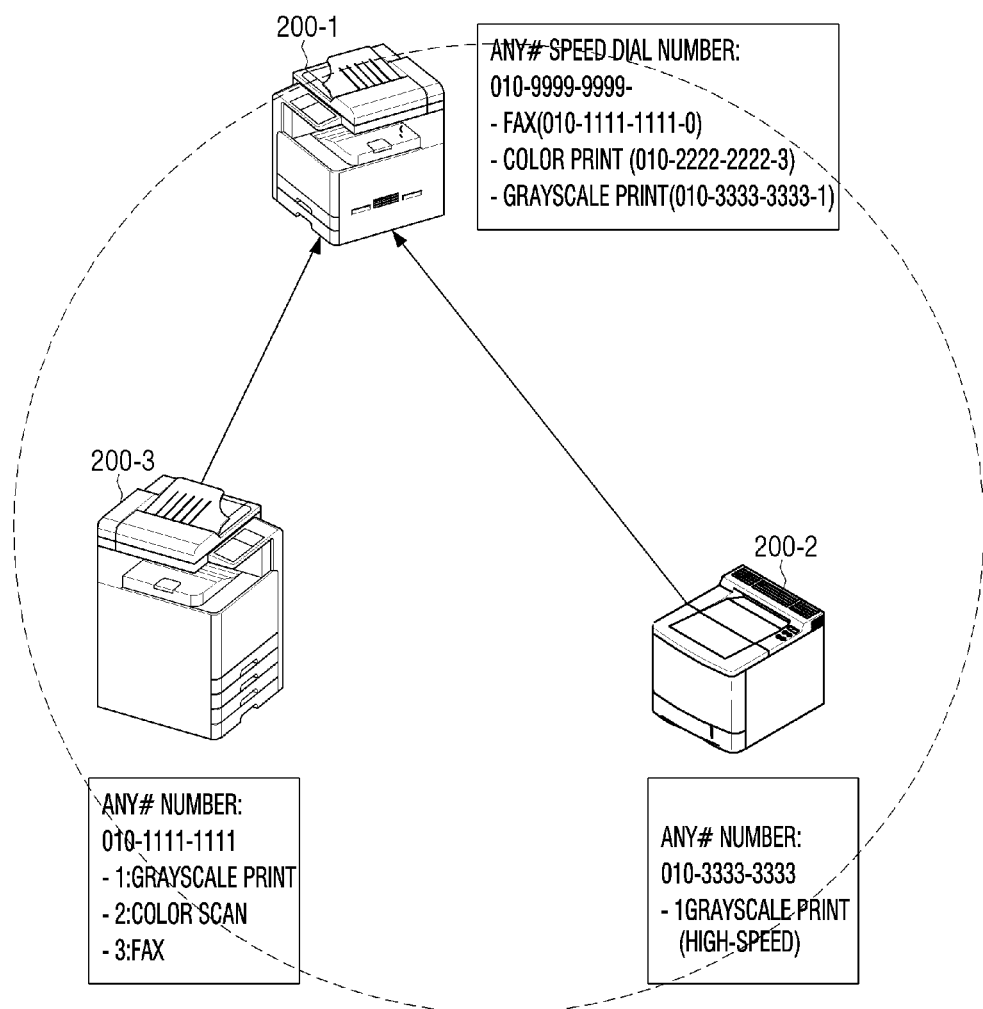
FIG. 11 is a diagram provided to describe a grouping method according to the third embodiment disclosed herein.

FIG. 11 is a diagram provided to describe a grouping method according to the third embodiment disclosed herein.

Referring to FIG. 11, an image forming device 200-1 among a plurality of image forming devices receives phone numbers of other image forming devices. In this case, the image forming device 200-1 may receive function numbers of other image forming devices along with the phone numbers.

Accordingly, the image forming device 200-1 and other image forming devices corresponding to the received phone numbers may be added to a work group.

For example, when a user inputs '010-1111-1111-3' and '010-3333-3333-1' in the first image forming device 200-1, a second image forming device corresponding to the phone number '010-1111-1111' and a third image forming device corresponding to the phone number '010-3333-3333' are added to the work group. In this case, the function numbers are inputted with the phone numbers, and thus, the tasks of the image forming devices may be added to the work group.

In the above embodiment, the first image forming device 200-1 generates the work group. However, in the implementation, the first image forming device 200-1 may transmit phone number information to the cloud server 100, and the cloud server 100 may generate a work group based on the information transmitted from the first image forming device 200-1.

As described above, according to the grouping method of the third embodiment, the user may input the phone numbers of the image forming devices to be added to the work group in the image forming device, thereby easily generating the work group without inconvenient configuration operation.

Figure 12:
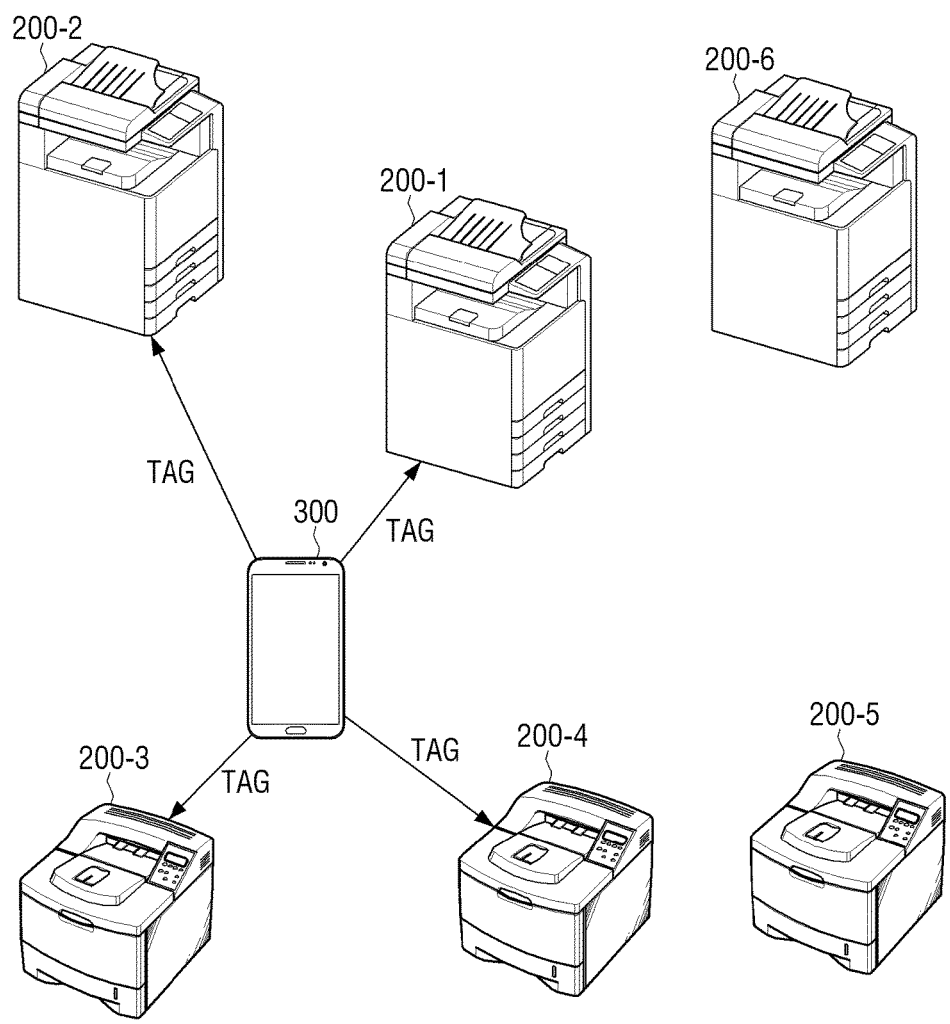
FIG. 12 is a diagram provided to describe a grouping method according to the fourth embodiment disclosed herein.

FIG. 12 is a diagram provided to describe a grouping method according to the fourth embodiment disclosed herein.

Referring to FIG. 12, a mobile device 300 performs a tagging operation with respect to a plurality of image forming devices 200-1, 200-2, 200-3, 200-4. This tagging operation may be performed in a process of generating a workform in the mobile device 300.

The mobile device 300 transmits information on the tagged image forming devices 200-1, 200-2, 200-3, 200-4 to a cloud server 100. In this case, the transmitted information may include address information and function information on the image forming devices.

The cloud server 100 may generate a work group based on the received information. That is, the cloud server 100 may generate the plurality of image forming devices that were NFC-tagged in the mobile device 300 as one work group.

For example, as illustrated in FIG. 12, when the mobile device 300 performed the tagging operation with respect to four image forming devices 200-1, 200-2, 200-3, 200-4 among six connectable image forming devices, the mobile device 300 may transmit the information on the image forming devices that were NFC-tagged to the cloud server 100.

As described above, according to the grouping method of the fourth embodiment, the work group is generated using an image forming device tagged by the user, and thus, the user may generate the work group intuitionally.

Figure 13:
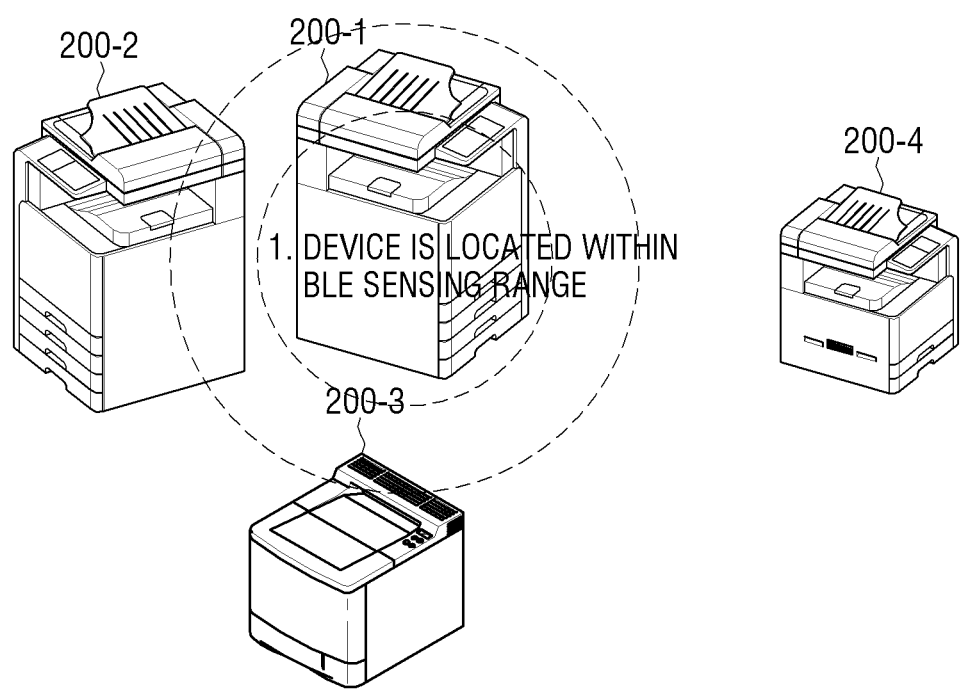
FIG. 13 is a diagram provided to describe a grouping method according to the fifth embodiment disclosed herein.

FIG. 13 is a diagram provided to describe a grouping method according to the fifth embodiment disclosed herein.

Referring to FIG. 13, each of a plurality of image forming devices 200-1, 200-2, 200-3 retrieves other image forming device that may communicate using a LAN, such as, Bluetooth. In this embodiment, the retrieving operation is performed using Bluetooth, but in the implementation, any other wireless communication methods may be used.

One image forming device among the plurality of image forming devices 200-1, 200-2, 200-3 may transmit its own information and information on other image forming device that may perform local area communication to a cloud server 100. The cloud server 100 may generate the plurality of image forming devices 200-1, 200-2, 200-3 that may perform the local area communication as one work group.

For example, as illustrated in FIG. 13, three image forming devices 200-1, 200-2, 200-3 are disposed within a Bluetooth communication coverage range, and thus, the first image forming device 200-1 may retrieve other image forming devices 200-2, 200-3 according to the Bluetooth method. Accordingly, the cloud server 100 may generate three image forming devices 200-1, 200-2, 200-3 as the work group.

As described above, according to the grouping method of the fifth embodiment, the image forming devices that may communicate with each other by using the LAN, such as, Bluetooth with the short communication range are grouped as a work group. Accordingly, the image forming devices within a short distance may be grouped as a work group. That is, the image forming devices that the user is easily able to access may be grouped as a work group.

In the above embodiment, the distance of the image forming devices is determined using Bluetooth, but in the implementation, the distance of the image forming devices may be determined by comparing Access Points (APs) that each image forming device may receive.

Figure 14:
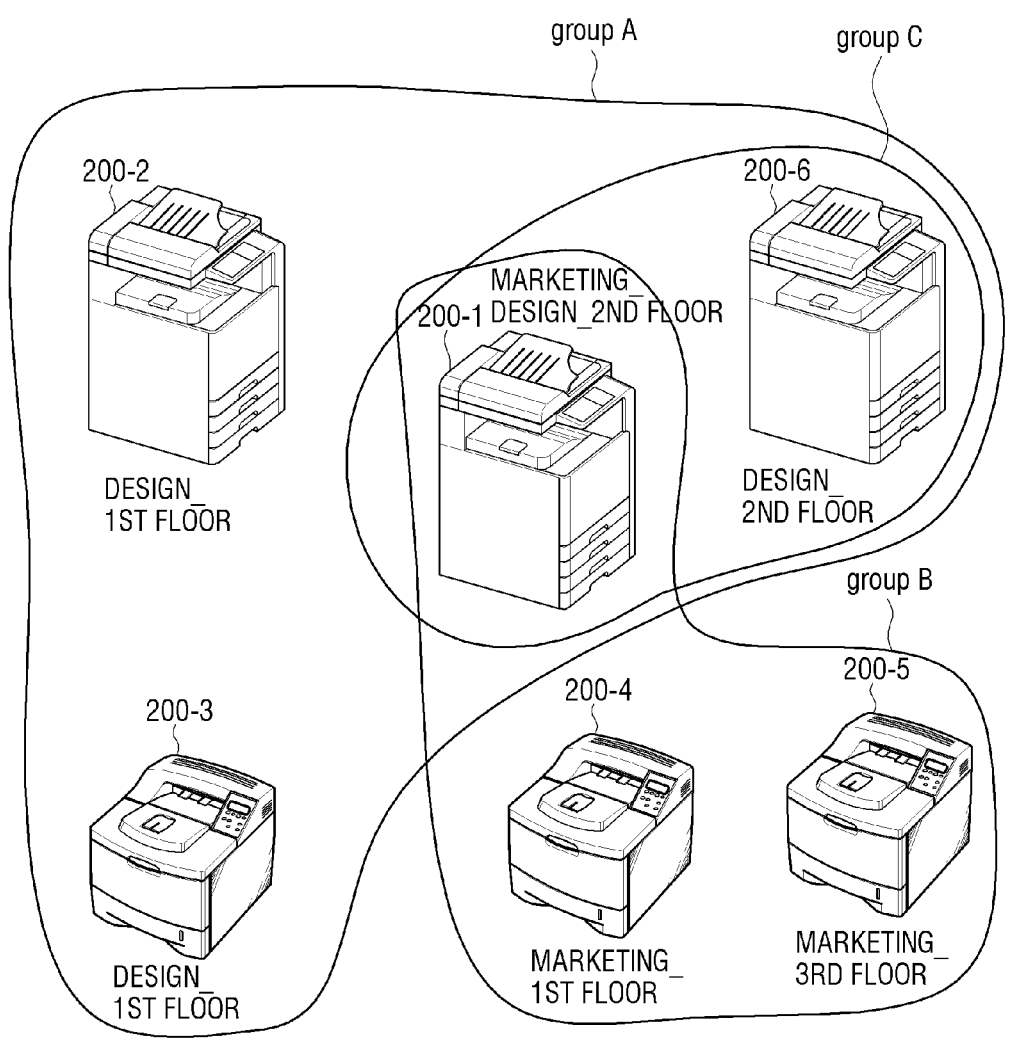
FIG. 14 is a diagram provided to describe a grouping method according to the sixth embodiment disclosed herein.

FIG. 14 is a diagram provided to describe a grouping method according to the sixth embodiment disclosed herein.

Referring to FIG. 14, device names of a plurality of image forming devices corresponding to a user account is retrieved. Subsequently, the image forming devices with the same identifier in the retrieved device names are grouped as one group. In this case, a cloud server 100 may generate a plurality of work groups for each identifier.

As an example, in response to 'marketing' being used as the identifier as illustrated in FIG. 14, the cloud server 100 may generate the image forming devices 200-1, 200-4, 200-5 as one work group.

As another example, in response to 'design' being used as the identifier, the cloud server 100 may generate the image forming devices 200-1, 200-3, 200-6 as one work group.

As still another example, in response to 'second floor' being used as the identifier, the cloud server 100 may generate the image forming devices 200-1, 200-6 as one work group.

As described above, according to the grouping method of the sixth embodiment, the image forming devices are grouped as a work group based on a device name. Accordingly, the work group may be generated without using any other additional component or may be generated automatically without a user manipulation.

FIG. 15 is a diagram provided to describe a grouping method according to the seventh embodiment disclosed herein.

Referring to FIG. 15, address information on image forming devices corresponding to a user account is detected. In this case, the address information may include an IP address, a hop count, and Subsystem Identification (SSID).

The image forming devices in the same subnet may be grouped as one work group based on the detected address information. In this case, a cloud server checks the hop count and the SSID of the image forming devices in the same subnet does not include an image forming device that is physically spaced apart in the work group.

To be specific, when the plurality of image forming devices are included in the same subnet, each image forming device may be spaced apart physically. For example, in a company using a plurality of floors of a building, each of the image forming devices in the company may have an address of the same subnet although the image forming devices are located at different floors. Accordingly, it is required to exclude the image forming device that is physically spaced apart although being included in the same subnet, through filtering.

Accordingly, in this embodiment, the hop count of each image forming device and the SSID of a wireless access point that is accessible in each image forming device are detected to determine whether the image forming devices are physically spaced apart.

To be specific, the hop count refers to a path where a data packet moves from one router to another router in a Packet Switching Network (PSN). In response to the data packet passing the router, the hop count decreases. Accordingly, in response to the data packet passing the router, the image forming devices may be physically spaced apart although being located in the same subnet, logically. Accordingly, in this embodiment, in response to a difference in a hop count of an image forming device being greater than a predetermined value as compared with the hop counts of other image forming devices, the image forming device is excluded through the filtering.

In case of a wireless network, the image forming devices may be physically spaced apart in the same subnet when the SSID of each of the connected wireless access points is different. Accordingly, the image forming device with the different SSID of the wireless access point may be excluded through the filtering.

For instance, as illustrated in FIG. 15, the image forming devices 200-2, 200-4, 200-6 whose last one digit of the IP address is different from the IP address of the image forming device 200-1, namely the image forming devices in the same subnet as the image forming device 200-1 may be grouped as a work group. In this case, when the SSID of the second image forming device is different from the SSID of the first image forming device, the second image forming device may be excluded from the work group.

As described above, according to the grouping method of the seventh embodiment, the grouping may be performed using only the address information that is the most basic element in communication. Accordingly, e grouping method of the seventh embodiment may be easily realized.

In the above embodiment, the image forming devices in the same subnet have the different hop counts, and an image forming device with the different SSID is excluded from the work group. However, in the implementation, the work groups may be distinguished by priority. Further, the image forming devices with the same hop count in the same subnet may be grouped as a work group with the first priority, and the image forming devices with the different hop counts in the same subnet may be grouped as a work group with the second priority.

Figure 16:
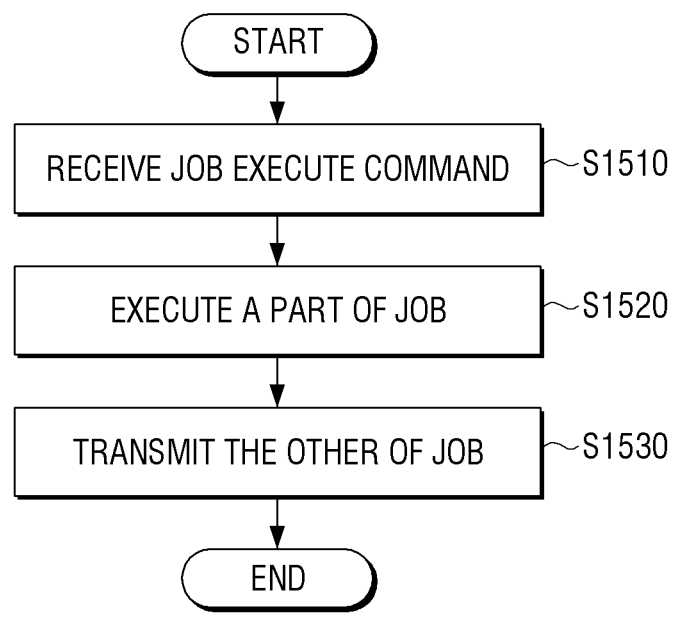
FIG. 16 is a flowchart provided to describe a printing control method in an image forming device according to an embodiment disclosed herein.

FIG. 16 is a flowchart provided to describe a printing control method in an image forming device according to an embodiment disclosed herein.

Referring to FIG. 16, a job execute command for a job using a plurality of functions is received (S1510). To be specific, the job execute command using virtual grouping may be received from a user through a mobile device 300 or a cloud server 100. This job execute command may be inputted in an image forming device 200 autonomously or inputted through the mobile device 300.

A part of the job is executed by performing at least one function among the plurality of functions corresponding to the job (S1520). To be specific, an image forming device 200-1 may be one of a printer, a scanner, a copier, a facsimile, and an MFP that may include at least one function among a scan function, a print function, a fax function, and an editing function. The image forming device 200-1 may execute a part of the job by using the function of a device that received the job execute command (or by using an executable function).

The other of the job that was not executed by the image forming device 200-1 is transmitted to other image forming device in a work group (S1530). To be specific, the function that is not executable in the image forming device 200-1 may be transmitted to other image forming device in the work group that may support the function corresponding to the job. Further, when the job is executable in the image forming device 200-1 but may be executed more rapidly in other image forming device, a part of the job (that is, the other of the job which will not be executed in the image forming device 200-1) may be transmitted to other image forming device in the work group.

In this case, the job may be transmitted to a plurality of image forming devices, not one image forming device. This transmission may be performed in parallel to execution of the function in the image forming device, not after completion of the execution.

As described above, according to the print control method of this embodiment, the image forming device 200-1 forms a work group with other connectable image forming devices. Accordingly, the image forming device may execute the job related to the functions that are not supported by the image forming device 200. Further, the image forming device may execute the job execute command related to the functions that are supported by the image forming device 200, and thus, the job may be executed more rapidly. The print control method of FIG. 16 may be executed in an image forming device with the structure of FIG. 6 or may be in an image forming device with any other structures.

The above-described print control method may be realized as a program with an executable algorithm that may be executed in a computer, and the program may be stored and provided in a non-transitory computer readable medium.

Figure 17:
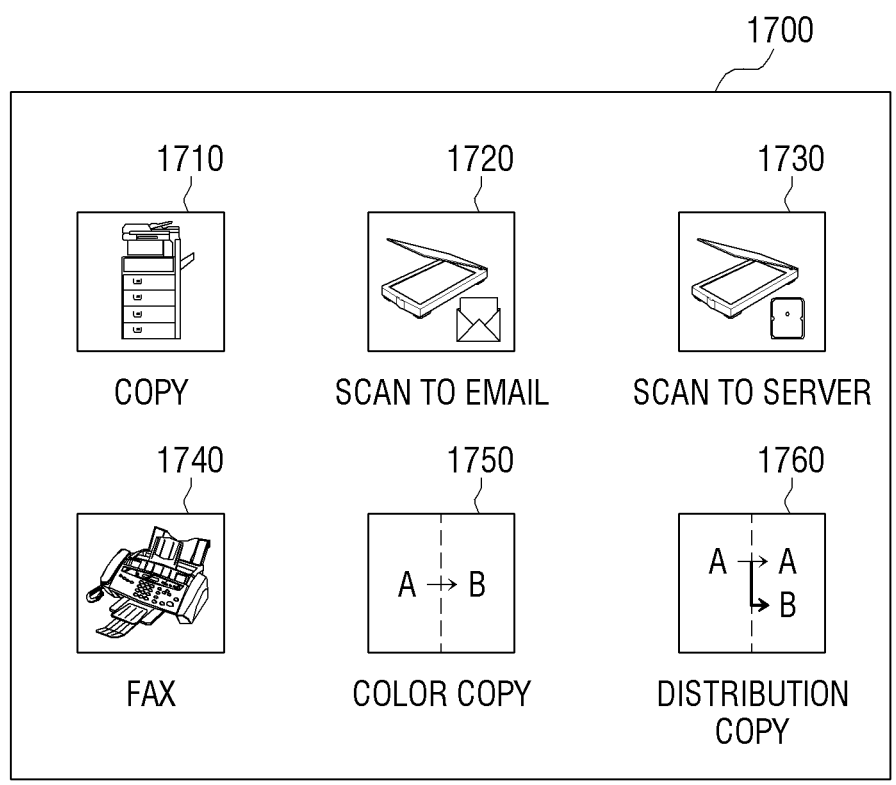
FIG. 17 is a diagram provided to describe an example of a User Interface (UI) window displayed in the mobile device of FIG. 1.

FIG. 17 is a diagram provided to describe an example of a User Interface (UI) window displayed in the mobile device of FIG. 1.

Referring to FIG. 17, a user interface window 1700 is an area for displaying tasks which are selectable by a user. The user interface window 1700 includes a copy area 1710, a scan-to-email area 1720, a scan-to-server area 1730, a fax area 1740, a color copy area 1750, and a distribution copy area 1760. In this embodiment, the user interface window 1700 displays six tasks, but the number and types of icons displayed in the user interface window 1700 may vary depending upon performance of a connected image forming device.

The copy area 1710 is an area for receiving a selection of a copy task as a task to be performed by an image forming device. In response to the copy area 1710 being selected by the user, an additional UI for receiving a selection of an option for the copy task may be displayed.

The scan-to-email area 1720 is an area for receiving a selection of a scan-to-email task as a task to be performed in the image forming device. In response to the scan-to-email area 1720 being selected by the user, an additional UI for receiving a selection of an option for the scan-to-email task may be displayed.

The scan-to-server area 1730 is an area for receiving a selection of a scan-to-server task as a task to be performed in the image forming device. In response to the scan-to-server area 1730 being selected by the user, an additional UI for receiving a selection of an option for the scan-to-server task may be displayed.

The fax area 1740 is an area for receiving a selection of a fax task as a task to be performed in the image forming device. In response to the fax area 1740 being selected by the user, an additional UI for receiving a selection of an option for the fax task may be displayed.

The color copy area 1750 is an area for receiving a selection of a color copy task as a virtual grouping function to be performed in the image forming device. An image forming device 200-1 does not include a color image forming unit, and thus, the color copy area 1750 is an area for using a task of other image forming device in a work group with the color image forming unit by using the virtual grouping function. In response to the work group including no image forming device with the color image forming unit, the color copy area 1750 may be inactivated.

The distribution copy area 1760 is an area for receiving a selection of a copy task as the virtual grouping function to be performed in the image forming device. The distribution copy is a copy command using other image forming device for executing a job more rapidly, and thus, in response to the job being selected, a UI for receiving a selection of other image forming device in the work group from the user may be displayed. Meanwhile, in the above embodiment, the image forming device is selected by the user in response to the distribution copy area 1760 being selected, but in the implementation, the image forming device may be determined automatically according to a predetermined condition. Further, when it is more rapid to execute the job autonomously without distribution or the job does not need to be distributed (for example, the copy job of making one copy), the distribution copy area 1760 may be inactivated.

Figure 18:
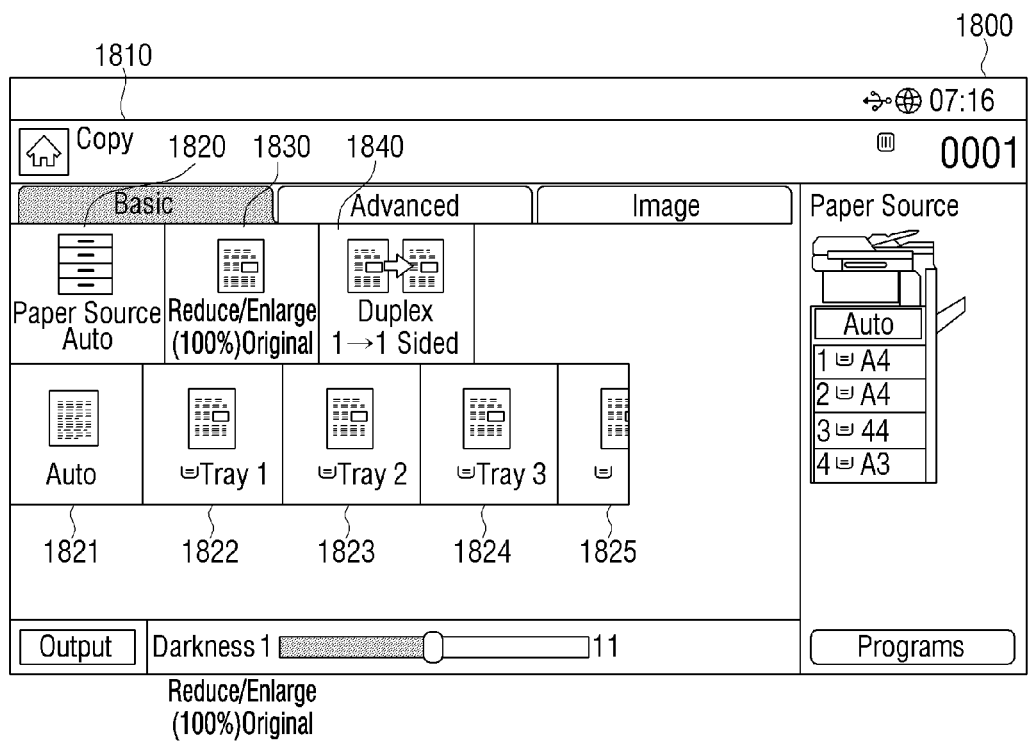
FIGS. 18 to 20 are diagrams provided to describe examples of a User Interface (UI) window displayed in the image forming device of FIG. 1.
Figure 19:
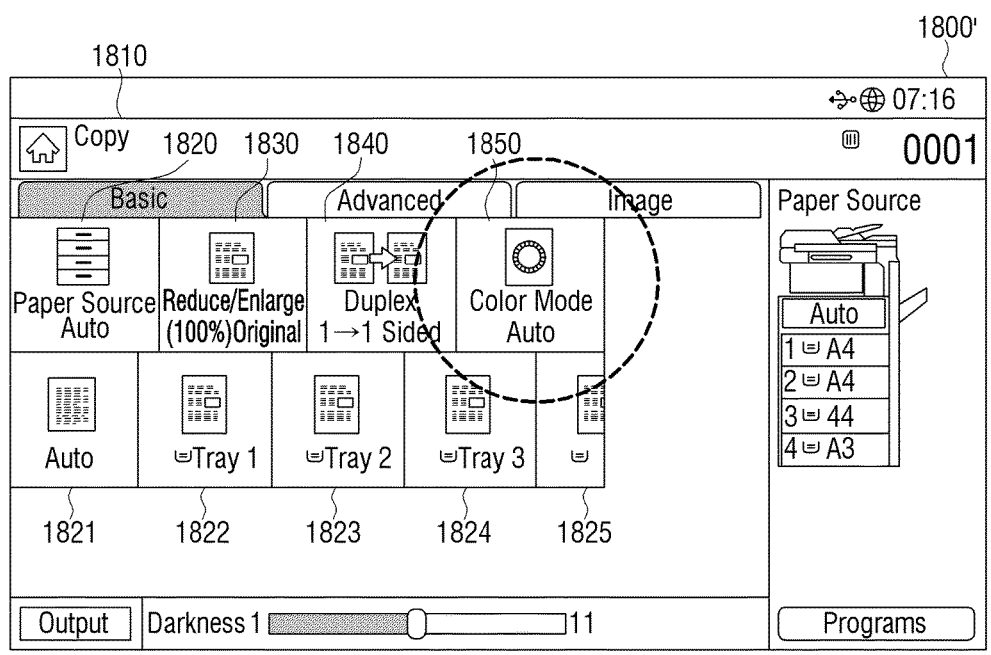
Figure 20:
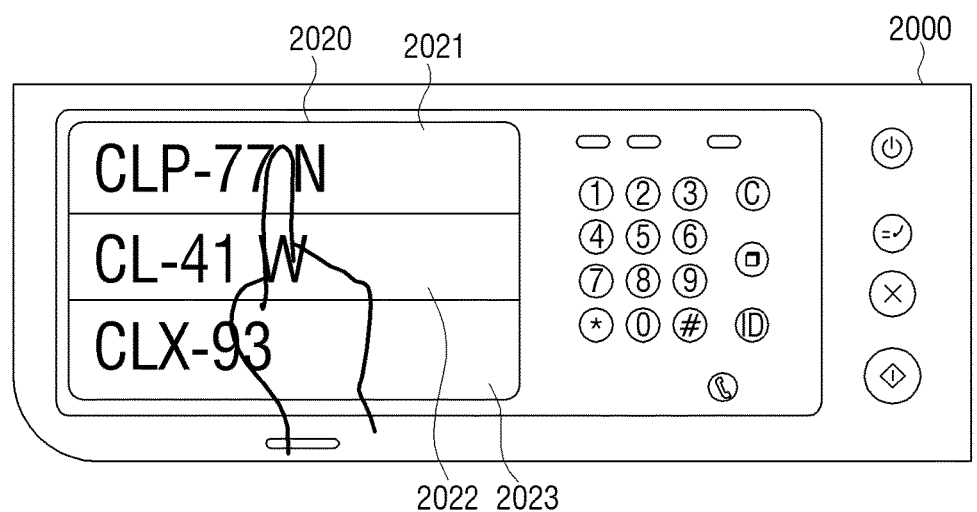

FIGS. 18 to 20 are diagrams provided to describe examples of User Interface (UI) windows displayed in the image forming device of FIG. 1.

FIG. 18 is a diagram provided to describe an example of a User Interface (UI) window when virtual grouping is not applied.

Referring to FIG. 18, a UI window 1800 displays tasks and options supported by an image forming device 200-1. To be specific, the image forming device 200-1 includes a scanning unit and an image forming unit, and thus, may execute a scan job, a print job, and a copy job. The UI window 1800 includes an area 1810 for displaying a task that is currently selected, and areas 2120, 2130, 2140 for receiving a selection of options for the task. In response to the area for receiving a selection of options for the task being selected, areas 1821, 1822, 1823, 1824, 1825 for receiving a selection of option values of the area are displayed.

In response to the virtual grouping being applied to the image forming device 200-1, the image forming device 200-1 may use the task of other image forming device 200-2 with the color printing task in the work group. Accordingly, the image forming device 200-1 may become support the color copy task. Hereinafter, a UI window that may be displayed in the image forming device 200-1 after the virtual grouping is applied will be described with reference to FIG. 19.

FIG. 19 is a diagram provided to describe an example of a user interface (UI) window when the virtual grouping is applied.

Referring to FIG. 19, a UI window 1800 is displayed with an area 1850 for receiving a setting of a color copy option. The user may select the color copy through an added option.

In response to the user inputting the color copy, and the work group including a plurality of image forming devices that support the color print function, the image forming device may display a UI window as illustrated in FIG. 20.

FIG. 20 is a diagram provided to describe an example of a user interface (UI) window that may be displayed when an area 2150 of FIG. 19 is selected.

Referring to FIG. 20, a user interface unit 2000 includes a list area 2020 for displaying other image forming device 2021, 2022, 2023 in a work group that support the color print function. The user may select one of the image forming devices in the displayed list. In this example, the device is selected by the user, but in the implementation, other image forming device satisfying a predetermined condition may be selected automatically.

Certain embodiments are described below in greater detail with reference to the accompanying drawings. In the following description, like drawing reference numerals are used for the like elements, even in different drawings. The matters defined in the description, such as detailed construction and elements, are provided to assist in a comprehensive understanding of embodiments. However, embodiments can be practiced without those specifically defined matters. Also, well-known functions or constructions are not described in detail since they would obscure the application with unnecessary detail.

The following embodiments are associated with a cloud server that supports an image forming service, a method thereof, and an image forming service. A detailed description on the common knowledge that is publicly known to a person having ordinary skill in the art (hereinafter referred to as 'those skilled in the art') of the following embodiments will be omitted.

FIG. 21 is a diagram provided to describe an image forming system according to another embodiment disclosed herein. Referring to FIG. 21, an image forming system 1000 includes a first management server 400-1 and a second management server 400-2 that communicate with a cloud server 100. The image forming system 1000' also includes a first image forming device 200-1 that communicates with the first management server 400-1 and a second image forming device 200-2 that communicates with the second management server 400-2. Further, image forming system 1000' includes first to third mobile devices 301-1, 301-2, 302.

In this case, the first management server 400-1 and the second management server 400-2 may be a Personal Computer (PC), a laptop computer, or the like. The first and second image forming devices 200-1, 200-2 may be a printer, a scanner, a copier, a facsimile, or an MFP.

Meanwhile, the number of the management servers 400-1, 400-2, the image forming devices 200-1, 200-2, and the mobile devices 301-1, 301-2, 302 of the image forming system 1000 is defined arbitrarily for convenience in explanation and does not limit the scope of the present disclosure.

The first management server 400-1 and the second management server 400-2 may be a laptop computer or a computer in a management office of a building. For example, a building where a plurality of people resident or stay, such as, a shopping center, an apartment building, an efficiency apartment building, includes the management office. The management office may manage and collect maintenance fees with respect to the residents in the building using the first management server 400-1 or the second management server 400-2.

As an example, in response to the first management server 400-1 being located in a first management office of 'Apartment building-A,' a first manager 11 may manage the maintenance fees of the residents of 'Apartment building-A' and issue a maintenance fee bill for collecting the maintenance fees by using the first management server 400-1.

As another example, in response to the second management server 400-2 being located in a second management office of 'Apartment building-B,' a second manager 12 may manage the maintenance fees of the residents of 'Apartment building-B' and issue a maintenance fee bill for collecting the maintenance fees by using the second management server 400-2.

The first image forming device 200-1 is located in the first the management office and communicates with the first management server 400-1. The second image forming device 200-2 is located in the second the management office and communicates with the second management server 400-2.

The first manager 11 may register the first image forming device 200-1 at a cloud server 100' by using the first management server 400-1. The second manager 12 may register the second image forming device 200-2 at the cloud server 100' by using the second management server 400-2.

The method for registering an image forming device will be described below in further detail with reference to FIG. 25.

The first manager 11 may register the first image forming device 200-1 at the cloud server 100 and then transmit a message for registering a device to use the first image forming device 200-1 to the residents of 'Apartment building-A' by using the first management server 400-1. The message may include a first link address for registering a device to use the first image forming device 200-1 (for example, a link address provided by the cloud server 100).

As an example, assuming that a first user 20-1 and a second user 20-2 are the residents of 'Apartment building-A,' the message for registering a device may be transmitted to a first mobile device 301-1 of the first user 20-1 and a second mobile device 301-2 of the second user 20-2. Accordingly, the first user 20-1 and the second user 20-2 may check the message displayed in the mobile devices 301-1, 301-2 and request for the registration of a device to use the first image forming device 200-1 to the cloud server 100.

As another example, assuming that a third user 30 is the resident of 'Apparent building-B,' the message for registering a device may be transmitted to a third mobile device 302 of the third user 30. Accordingly, the third user 30 may check the message displayed in the third mobile device 302 and request for the registration of a device to use the second image forming device 200-2 to the cloud server 100.

In this embodiment, the first to third users 20-1, 20-2, 30 may request for use registration with respect to the first image forming device 200-1 or the second image forming device 200-2 to the cloud server 100 by using unique information on the first to third mobile devices 301-1, 301-2, 302. According to the request, the cloud server 100' matches and manages the first image forming device 200-1 with the first and second mobile devices 301-1, 301-2 and the second image forming device 200-2 with the third mobile device 302.

In this case, the unique information on the first to third mobile devices 301-1, 301-2, 302 may be one of a phone number of each of the first to third mobile devices 301-1, 301-2, 302, user information on each of the first to third mobile devices 301-1, 301-2, 302, and a serial number of a Universal Subscriber Identity Module (USIM) installed in each of the first to third mobile devices 301-1, 301-2, 302.

The cloud server 100' supports the cloud printing service. Accordingly, the first to third users 20-1, 20-2, 30 may access the cloud server 100' by using the first to third mobile devices 301-1, 301-2, 302 and use the printing service provided by the first image forming device 200-1 or the second image forming device 200-2 that communicates with the cloud server 100.

The cloud server 100 stores the unique information on the first to third mobile devices 301-1, 301-2, 302. In this case, the cloud server 100' may classify and store the unique information on the first to third mobile devices 301-1, 301-2, 302 into a plurality of groups. To be specific, the cloud server 100' may classify at least one mobile device matched with each image forming device as one group.

For example, the cloud server 100' may classify the first and second mobile device 301-1, 301-2 matched with the first image forming device 200-1 as an 'Apartment building-A' group and classify the third mobile device 302 matched with the second image forming device 200-2 as an 'Apartment building-B' group.

The cloud server 100' supports the image forming service based on the first image forming device 200-1 or the second image forming device 200-2. In response to the first image forming device 200-1 or the second image forming device 200-2 being used, the cloud server 100' manages charging data according to the usage.

To be specific, in response to receiving a job execute request for an image forming job using the first image forming device 20-1 or the second image forming device 200-2 from the first to third mobile devices 301-1, 301-2, 302, the cloud server 100' instructs the first image forming device 200-1 or the second image forming device 200-2 to execute the image forming job. In this case, the mobile devices may be a mobile device described in connection with FIG. 7 or other different mobile devices.

By way of example, in response to the first user 20-1 accessing the cloud server 100 by using the first mobile device 301-1 and then selecting the first image forming device 200-1 as a device for executing a print job for a certain content, the cloud server 100' receives a job execute request for the print job using the first image forming device 200-1.

As described above, the first user 20-1 may be the resident of 'Apartment building-A.' In response to the print job being unavailable in a home of the first user 20-1 due to non-existence or breakdown of an image forming device or run-out of the consumables, the first user 20-1 may execute the print job by using the first image forming device 200-1 in the first the management office of 'Apartment building-A.'

In response to the first image forming device 200-1 being used by the first mobile device 301-1, the cloud server 100' matches the charging data according to the usage of the first image forming device 200-1 with the unique information on the first mobile device 301 and manages the cumulative data.

In response to the first image forming device 200-1 being used by the second mobile device 301-2, the cloud server 100 matches the charging data according to the usage of the first image forming device 200-1 with the unique information on the second mobile device 301-2 and manages the cumulative data.

In response to the second image forming device 200-2 being used by the third mobile device 302, the cloud server 100' matches the charging data according to the usage of the second image forming device 200-2 with the unique information on the third mobile device 302 and manages the cumulative data.

In response to an event for a charging operation occurring, the cloud server 100' may transmit the charging data to the first management server 400-1 or to the second management server 400-2 in a group unit corresponding to the event.

For example, in response to the event for a charging operation occurring, the cloud server 100' may transmit the charging data with respect to the first and second mobile devices 301-1, 301-2 matched with the first image forming device 200-1, that is, the charging data with respect to the 'Apartment building-A' group, to the first management server 400-1.

Further, the cloud server 100' may transmit the charging data with respect to the third mobile device 302 matched with the second image forming device 200-2, that is, the charging data with respect to the 'Apartment building-B' group, to the second management server 400-2.

In response to receiving the charging data with respect to the first and second mobile devices 301-1, 301-2, the first management server 400-1 classifies and transmits the charging data corresponding to each of the first mobile device 301-1 and the second mobile device 301-2 to the first mobile device 301-1 and the second mobile device 301-2. Accordingly, the first user 20-1 or the second user 20-2 may check the charging data according to the usage of the first image forming device 200-1 through the mobile device.

Further, the first management server 400-1 may transmit the charging data to the first image forming device 200-1 such that the first image forming device 200-1 outputs the charging data in a form of a charge bill. In this case, the first management server 400-1 may classify and transmit the charging data corresponding to each of the first mobile device 301-1 and the second mobile device 301-2 to the first image forming device 200-1.

The first manager 11 may transmit the charge bills outputted in the first image forming device 200-1 to the first user 20-1 and the second user 20-2, respectively.

In response to receiving the charging data with respect to the first and second mobile devices 301-1, 301-2, the first management server 400-1 may classify the charging data corresponding to each of the first mobile device 301-1 and the second mobile device 302-2 and withdraw an amount corresponding to each charging data automatically from a bank account of the first user 20-1 and the second user 20-2 based on account information on the first user 20-1 and the second user 20-2.

The first management server 400-1 may manage, charge, and authorize the maintenance fees of the users in 'Apartment building-A', and thus, the first management server 400-1 may add the amount corresponding to the charging data according to the usage of the first image forming device 200-1 to the maintenance fees and authorize the amount automatically.

As in the example of the image forming system 1000' of FIG. 21, when certain users use the image forming service supported by the cloud server 100' continuously, the regular charging operation is required rather than one-time charging. Accordingly, in case of a shopping center, an apartment building, or an efficiency apartment building with fixed users, the charging operations for a batch of users may be performed regularly by managing the cumulative charging data according to the usage of the image forming devices in the respective buildings.

FIG. 22 is a block diagram illustrating a structure of a cloud server according to another embodiment disclosed herein. Referring to FIG. 22, a cloud server 100 may include a communication interface unit 120, a storage unit 150, and a control unit 130. In this case, the cloud server 100' is a server supporting an image forming service.

The communication interface unit 120 is a hardware component supporting a wired and/or wireless communication function. The communication interface unit 120 may support the wireless communication methods including Wi-Fi, Wi-Fi Direct, NFC, or Bluetooth, the wired communication methods through Ethernet, the mobile communication methods including 2nd Generation (2G), 3rd Generation (3G), or 4th Generation (4G), and so on.

The communication interface unit 120 according to this embodiment may communicate with the management servers 400-1, 400-2, the mobile devices 301-1, 301-2, 302, and the image forming devices 200-1, 200-2 of FIG. 21 by means of the above-described communication methods.

The storage unit 150 stores an application for executing the image forming service. Further, the storage unit 150 stores information necessary for executing the image forming service according to this embodiment.

The control unit 130' controls overall operations of the cloud server 100. Hereinafter, a detailed description on the operations of the control unit 130 will be provided in connection with the first management server 400-1, the first and second mobile devices 301-1, 301-2, and the first image forming device 200-1 of FIG. 21. The operations of the control unit 130' may be applied to the second management server 400-2, the third mobile device 302, and the second image forming device 200-2 in the same manner.

In response to receiving device registration information for registering the first image forming device 200-1 from the first management server 400-1, the control unit 130' stores the device registration information. Accordingly, the control unit 130' may be a component for providing the image forming service through the cloud server 100' and may register the first image forming device 200-1.

The device registration information may include a group name of a group including the first image forming device 200-1 and device identification information. In this case, the group name may be a building name where the first image forming device 200-1 is located, and the device identification information may be a phone number assigned to first image forming device 200-1. However, the device identification information is not limited to the phone number and may be an IP address of the first image forming device 200-1.

As described above, in response to the registration of the first image forming device 200-1 being completed, the control unit 130 generates a link address for the registration of a device to use the first image forming device 200-1. The link address may be an address of a page screen used when registering the device to use the first image forming device 200-1.

The control unit 130' may transmit the link address to the first management server 400-1. By the operation, the first management server 400-1 may transmit a message including the link address to the first mobile device 301-1 and the second mobile device 301-2. The first mobile device 301-1 and the second mobile device 301-2 may be registered as a device to use the first image forming device 200-1 through access with respect to the link address.

As described above, in response to receiving a request for registration of the device to use the first image forming device 200-1 from the first mobile device 301-1 and the second mobile device 301-2, the control unit 130' matches the unique information on the first mobile device 301-1 and the second mobile device 301-2 with the device identification information on the first image forming device 200-1 in the group including the first image forming device 200-1 and stores the matched information in the storage unit 150.

In this case, the unique information on the first mobile device 301-1 and the second mobile device 301-2 may be one of the phone number of each of the mobile devices 301-1, 301-2, the user information on each of the mobile devices 301-1, 301-2, and a serial number of a Universal Subscriber Identity Module (USIM) installed in each of the mobile devices 301-1, 301-2.

In response to receiving a request for registration of the device to use the first image forming device 200-1 from the first mobile device 301-1 and the second mobile device 301-2, the control unit 130 may transmit an application for controlling the first image forming device 200-1 to the first mobile device 301-1 and the second mobile device 301-2.

By the above-described operation, the control unit 130' may manage the first and second mobile devices 301-1, 301-2 as one group to use the first image forming device 200-1. In response to the second image forming device 200-2 and the third mobile device 302 of FIG. 21 being registered at the cloud server 100, the control unit 130' may manage the third mobile device 302 as one group to use the second image forming device 200-2.

In response to receiving a job execute request for the image forming job from the first mobile device 301-1, the control unit 130' requests for status information on the first image forming device 200-1 to the first image forming device 200-1 matched with the first mobile device 301-1. In response to receiving the status information from the first image forming device 200-1 according to the request, the control unit 130 instructs the first image forming device 200-1 to execute the image forming job based on the status information.

The status information includes information as to whether execution of the image forming job is 'available' or 'unavailable.' In response to the execution of the image forming job being 'unavailable,' the status information includes detailed information on an 'unavailable' status. For example, in response to toner of the first image forming device 200-1 being used up, the status information may include the information of the 'unavailable' status and a 'run-out of toner' status.

In response to the status information representing 'available, the control unit 130' instructs the first image forming device 200-1 to execute the image forming job. In response to the image forming job being executed in the first image forming device 200-1, the control unit 130' stores the charging data according to the usage of the first image forming device 200-1.

To be specific, as the first image forming device 200-1 was used by the first mobile device 301-1, the control unit 130' may match the charging data with the unique information on the first mobile device 301-1 and manages the cumulative data. That is, the control unit 130 may store the cumulative information on a date of use, a usage history, and the charging information in the storage unit 150 every time the first image forming device 200-1 is used by the first mobile device 301-1.

In response to the event for a charging operation occurring, the control unit 130' transmits the charging data with respect to the first and second mobile devices 301-1, 301-2 matched with the first image forming device 200-1 to the first management server 400-1.

In this case, the event for a charring operation may be one of an event where a request with respect to the charging data is received from the first management server 400-1, an event where a data transmission cycle being predetermined in connection with the charging data elapses, and an event where the number of data accumulation being configured in connection with the charging data overruns.

According to an embodiment, in response to receiving the request with respect to the charging data from the first management server 400-1, the control unit 130' may transmit the charging data with respect to the first and second mobile devices 301-1, 301-2 to the first management server 400-1.

According to another embodiment, in response to the data transmission cycle being predetermined on a monthly basis in connection with the charging data, the control unit 130 may transmit the charging data with respect to the first and second mobile devices 301-1, 301-2 to the first management server 400-1 after every one month.

According to still another embodiment, in response to the data transmission cycle being predetermined on a basis of one hundred times in connection with the charging data, the control unit 130' may transmit the charging data with respect to the first and second mobile devices 301-1, 301-2 to the first management server 400-1 every time the number of times of using the first image forming device 200-1 exceeds one hundred times.

In response to the status information representing 'unavailable,' the control unit 130' transmits the status information to the first mobile device 301-1. Accordingly, the first user 20-1 with the first mobile device 301-1 may check the current status of the first image forming device 200-1.

In response to information on an after-sales service (A/S) center related to the first image forming device 200-1 being pre-registered, the control unit 130' may transmit the status information on the first image forming device 200-1 to the A/S center. Accordingly, the A/S center may check the status information on the first image forming device 200-1 and take a necessary action.

In the above embodiment, the control unit 130' requests for the status information on the first image forming device 200-1, but not limited thereto. For example, the first image forming device 200-1 may monitor its own status regularly, and in response to determining that the first image forming device 200-1 is unable to execute the image forming job, may transmit the status information on the situation to the cloud sever 100' automatically.

According to the cloud server 100 of FIG. 22, at least one mobile device of the respective image forming devices may be grouped and managed, and thus, the cumulative charging data with respect to each image forming device may be managed by groups.

Figure 23:
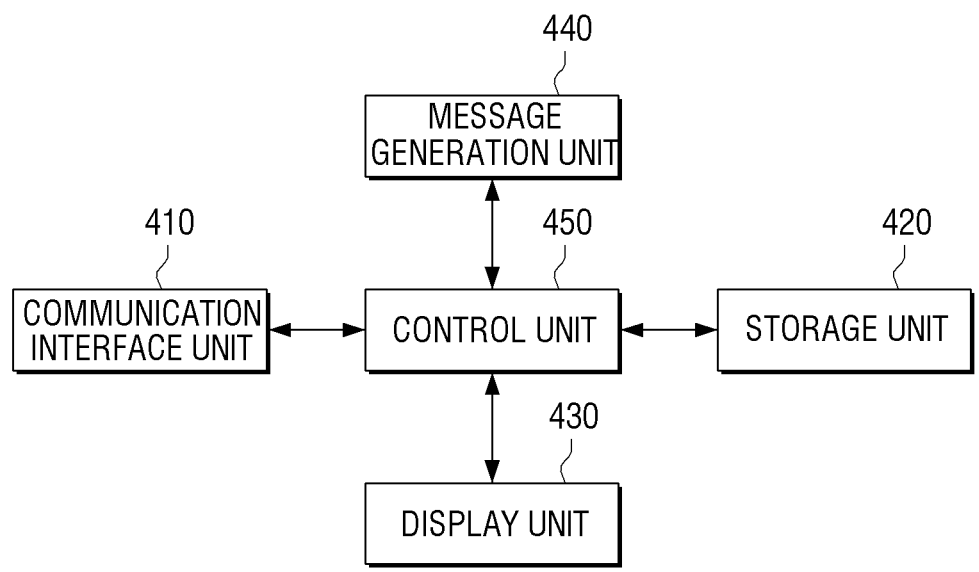
FIG. 23 is a block diagram illustrating a structure of a management server according to an embodiment disclosed herein.

FIG. 23 is a block diagram illustrating a structure of a management server according to an embodiment disclosed herein. Referring to FIG. 23, a first management server 400-1 includes a communication interface unit 410, a storage unit 420, a display unit 430, a message generation unit 440, and a control unit 450.

The communication interface unit 410 is a hardware component supporting a wired and/or wireless communication function. The communication interface unit 120 may support the wireless communication methods including Wi-Fi, Wi-Fi Direct, NFC, or Bluetooth, the wired communication methods through Ethernet, the mobile communication methods including 2nd Generation (2G), 3rd Generation (3G), or 4th Generation (4G), and so on.

The communication interface unit 410 according to this embodiment may communicate with the management servers 400-1, 400-2, the mobile devices 301-1, 301-2, 302, and the image forming devices 200-1, 200-2 as illustrated in FIG. 21 by means of the above-described communication methods.

The storage unit 420 stores a printer driver program of the first image forming device 200-1.

Further, the storage unit 420 stores the group name and the device identification information on the pre-registered first image forming device 200-1. In this case, the group name may be a name of a building where the first management server 400-1 and the first image forming device 200-1 are located, and the device identification information may be a phone number assigned to the first image forming device 200-1.

In response to the first image forming device 200-1 including no fax transmission function, a phone number may be not assigned. In this case, the device identification information may be the IP address of the first image forming device 200-1.

The storage unit 420 stores information on the users in the building where the first management server 400-1 is located. For example, the storage unit 420 may store names, the unique information, and the account information of the entire users of 'Apartment building-A.'

Further, the storage unit 420 may store a maintenance fee program for managing the maintenance fees of the entire users of 'Apartment building-A.'

The display unit 430 displays various screens related to the operations of the first management server 400-1. To be specific, the display unit 430 may display a screen for inputting the information on the users and a screen for registering the first image forming device 200-1 at the cloud server 100'.

The message generation unit 440 may generate a message to be transmitted to mobile devices of a plurality of users. In this case, the message may be a Short Message Service (SMS) message or a Multimedia Message Service (MMS) message.

The control unit 450 controls overall operations of the first management server 400-1.

In response to the first management server 400-1 initially accessing the cloud server 100', the display unit 430 displays an input screen for inputting the device registration information provided by the cloud server 100'.

The input screen may include input entries for inputting the group name of the group including the first image forming device 200-1 and the device identification information on the first image forming device 200-1. In response to the group name and the device identification information being inputted in the input screen, the first management server 400-1 may request for registration of the first image forming device 200-1 to the cloud server 100'.

In response to the registration of the first image forming device 200-1 being completed, the communication interface unit 410 may receive a link address for registration of a device to use the first image forming device 200-1 from the cloud server 100. The link address may be an address of a page screen used when registering the device to use the first image forming device 200-1.

Further, as described above, in response to the registration of the first image forming device 200-1 being completed, the communication interface unit 410 may receive an application for executing the image forming service from the cloud server 100'. The application is stored in the storage unit 420.

The control unit 450 may control the message generation unit 440 to generate a message for use registration with respect to the first image forming device 200-1 by using the link address. In this case, the message may further include the ID and password necessary for authentication, on top of the link address.

In response to the message being generated, the control unit 450 may control the communication interface unit 410 to transmit the message to the mobile devices of the entire users in 'Apartment building-A.' Accordingly, a user who wants to use the first image forming device 200-1 among the entire users in 'Apartment building-A' may select the link address from the mobile device and access the cloud server 100. Further, the user may register the mobile device as a device to use the first image forming device 200-1.

The control unit 450 performs the charging operation according to the usage of the first image forming device 200-1. For doing this, in response to a predetermined data request cycle elapsing or a request command for the charging data being inputted by the manager 11, the control unit 450 may request for the charging data with respect to the group including the first image forming device 200-1 to the cloud server 100.

In response to receiving the charging data, the control unit 450 performs the charging operation based on the received charging data.

According to an embodiment, the control unit 450 may classify the charging data for each mobile device and transmit the charging data to each mobile device. The charging data may include the account information on an account for settling an amount corresponding to the charging data. The account information may be account information for paying the maintenance fees with respect to 'Apartment building-A.'

According to another embodiment, the control unit 450 may classify the charging data for each mobile device and transmit the charging data to the first image forming device 200-1 such that the first image forming device 200-1 outputs the charging data in a form of the charge bill.

According to still another embodiment, the control unit 450 may automatically withdraw an amount corresponding to the charging data of each user from a bank account of each user based on the account information on the bank account. That is, the storage unit 420 stores the names, the unique information, and the account information of the entire users of 'Apartment building-A,' and thus, the control unit 450 may automatically withdraw the amount corresponding to the charging data by using the account information.

According to the first management server 400-1 of FIG. 23, the first management server 400-1 may perform the charging operations according to the usage of the first image forming device 200-1 in batches with respect to the users in the building. Further, the first management server 400-1 may perform the regular charging operations on a monthly basis, on a quarterly basis, on a half-yearly basis, or on a yearly basis.

Figure 24:
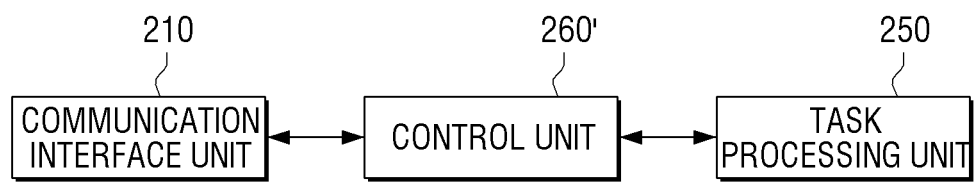
FIG. 24 is a block diagram illustrating a structure of an image forming device according to another embodiment disclosed herein.

FIG. 24 is a block diagram illustrating a structure of an image forming device according to another embodiment disclosed herein. Referring to FIG. 24, a first image forming device 200-1 may include a communication interface unit 210, a control unit 260, and a task processing unit 250. FIG. 24 illustrates only the components and operations of the first image forming device 200-1, but a second image forming device 200-2 may also include the same components as the first image forming device 200-1.

The communication interface unit 210 is a hardware component supporting a wired and/or wireless communication function. The communication interface unit 120 may support the wireless communication methods including Wi-Fi, Wi-Fi Direct, NFC, or Bluetooth, the wired communication methods through Ethernet, the mobile communication methods including 2nd Generation (2G), 3rd Generation (3G), or 4th Generation (4G), and so on.

The communication interface unit 210 may communicate with the management servers 400-1, 400-2, the mobile devices 301-1, 301-2, and the image forming devices 200-1, 200-2 of FIG. 21 by means of the above-described communication methods.

The task processing unit 250 may be a hardware unit for executing an image forming job including scanning, printing, fax transmission, or the like. That is, the task processing unit 250 may be realized as a scanning unit, a printing unit, a fax transmission unit, or the like.

The control unit 260 controls overall operations of the first image forming device 200-1.

The control unit 260' controls the task processing unit 250 according to the control of the cloud server 100' or the first management server 400-1. To be specific, the control unit 260' may control the task processing unit 250 to execute the image forming job according to a job execute command for the image forming job received from the cloud server 100. In this case, the job execute command for the image forming job is received through the cloud server 100' but may have been requested by the first mobile device 301-1 or the second mobile device 301-2 substantially.

The control unit 260' may control the task processing unit 250 to execute the image forming job according to a job execute command for the image forming job received from the first management server 400-1.

Further, the control unit 260' monitors a status of the task processing unit 250.

According to an embodiment, in response to receiving a request for the status information from the cloud server 100, the control unit 260' may monitor the status of the task processing unit 250 and transmit the status information to the cloud server 100.

According to another embodiment, the control unit 260 may monitor the status of the task processing unit 250 periodically, and in response to any abnormality being found, that is, in response to the execution of the image forming job being 'unavailable,' the control unit 260' may transmit the status information to the cloud server 100.

Figure 25:
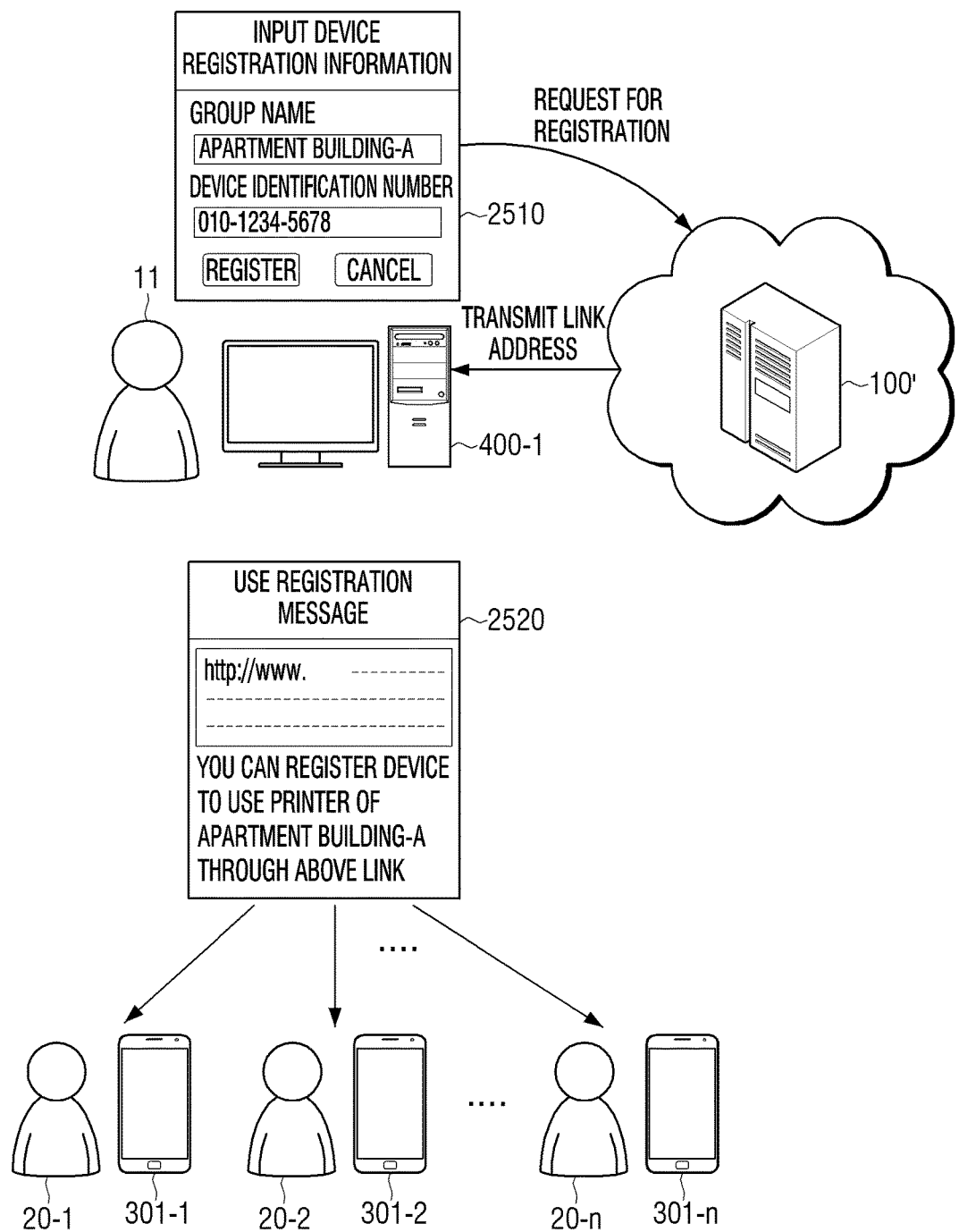
FIG. 25 is a diagram provided to describe a method for registering a device according to an embodiment disclosed herein.

FIG. 25 is a diagram provided to describe a method for registering a device according to an embodiment disclosed herein. Referring to FIG. 25, in response to a first management server 400-1 initially accessing a cloud server 100, the first management server 400-1 displays an input screen 2510 for inputting device registration information provided from the cloud server 100'.

A manager 11 inputs 'Apartment building-A' where the first image forming device 200-1 is located and a phone number of the first image forming device 200-1 in the input screen 2510 and then press a 'Register' button. By this operation, the first management server 400-1 may request for registration of the first image forming device 200-1 to the cloud server 100.

In response to the registration of the first image forming device 200-1 being completed, the cloud server 100 transmits a link address for registering a device to use the first image forming device 200-1 to the first management server 400-1.

The first management server 400-1 may transmit a message 2520 including the link address to the mobile devices 301-1, 301-2, . . . , 301-n of entire users 20-1, 20-2, . . . , 20-n in 'Apartment building-A.' The message 2520 is a notification message for registering a mobile device to use the first image forming device 200-1.

The users who want to use the first image forming device 200-1 based on the cloud server 100' among the entire users 20-1, 20-2, . . . , 20-n may select the link information included in the message 2520. Subsequently, the users may perform a registration process for using the first image forming device 200-1. A detailed description on the operation will be provided below with reference to FIG. 26.

In response to an application for controlling the first image forming device 200-1 being deleted due to initialization or updating of the first mobile device 301-1, the first user 20-1 accesses the cloud server 100' by using the first mobile device 301-1. Subsequently, the first user 20-1 may retrieve the first image forming device 200-1 by using the phone number of the first mobile device 301-1.

In response to receiving a request for transmission of link information for registration of the first mobile device 301-1 from the first user 20-1, the cloud server 100 transmits a message including the link information to the first mobile device 301-1. In this case, the message may be the same as the message 2520 of FIG. 25. Accordingly, the users may perform the registration process for using the first image forming device 200-1 by selecting the link information included in the message 2520.

Figure 26:
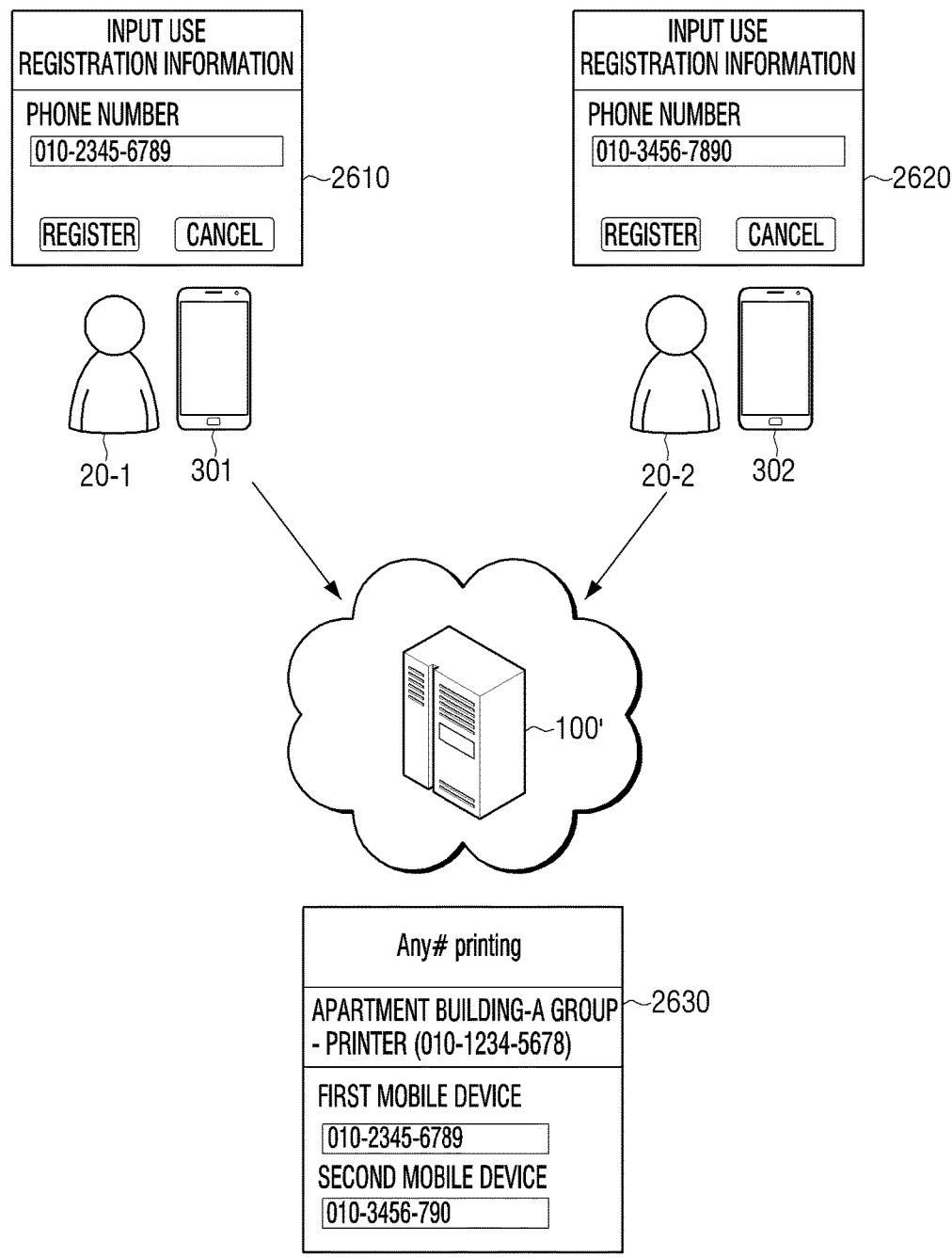
FIG. 26 is a diagram provided to describe a method for performing use registration with respect to an image forming device according to an embodiment disclosed herein.

FIG. 26 is a diagram provided to describe a method for performing use registration with respect to an image forming device according to an embodiment disclosed herein. This embodiment will be described based on an example where a first user 20-1 and a second user 20-2 register their mobile devices 301-1, 301-2 at a cloud server 100' to use a first image forming device 200-1.

In response to link information being selected in the message 2520, the first mobile device 301-1 and the second mobile device 301-2 may display input screens 2610, 2620 for inputting use registration information, respectively.

The first user 20-1 inputs a phone number of the first mobile device 301-1 in the input screen 2610 displayed in the first mobile device 301-1 and then presses a 'Register' button.

The second user 20-2 inputs a phone number of the second mobile device 301-2 in the input screen 2620 displayed in the second mobile device 301-2 and then presses a 'Register' button.

According to the above operations, the first and second mobile devices 301-1, 301-2 transmit the phone numbers inputted in the input screens 2610, 2620 to the cloud server 100. Accordingly, the cloud server 100' may match and manage the phone numbers of the first and second mobile devices 301-1, 301-2 with the first image forming device 200-1.

That is, the cloud server 100' manages group information 630 on an 'Apartment building-A' group. In this case, the group information 630 includes the first image forming device 200-1 as a device for providing the cloud printing service and includes the first and second mobile devices 301-1, 301-2 as devices to use the first image forming device 200-1.

In response to the first and second mobile devices 301-1, 301-2 being registered as the devices to use the first image forming device 200-1 by the above operations, the cloud server 100' may transmit an application for controlling the first image forming device 200-1 to the first mobile device 301-1 and the second mobile device 301-2.

In FIG. 26, only the group information 630 on the 'Apartment building-A' group is illustrated and described, but the cloud server 100' may manage group information on other groups.

FIG. 27 is a diagram provided to describe a method for managing charging data according to execution of a print job. Referring to FIG. 27, a first user 20-1 accesses a cloud server 100' by using a first mobile device 301-1 and requests for execution of a print job to the cloud server 100' (①) request to execute the print job).

According to the request, the cloud server 100' retrieves an image forming device matched with the phone number of the first mobile device 301-1. To be specific, the cloud server 100' may retrieve an image forming device matched with the phone number of the first mobile device 301-1 by retrieving group information including the phone number of the first mobile device 301-1 from among a plurality of pieces of group information.

In response to the plurality of pieces of group information including no group information including the phone number of the first mobile device 301-1, the cloud server 100' may transmit a message notifying that a request for registration is required to the first mobile device 301-1.

In response to the first image forming device 200-1 matched with the phone number of the first mobile device 301-1 being retrieved, the cloud server 100 requests for the status information to the first image forming device 200-1 (② request for the status information). According to the request, the first image forming device 200-1 transmits the status information to the cloud server 100' (③ transmit the status information).

In response to determining that the execution of the image forming job is 'available' based on the status information, the cloud server 100' may instruct the first image forming device 200-1 to execute the print job (④ instruct to execute the print job).

In response to determining that the execution of the image forming job is 'unavailable' based on the status information, the cloud server 100' may transmit the status information on the first image forming device 200-1 to an A/S center 700 (⑤ transmit the status information) or to the first mobile device 301-1 (⑤ transmit the status information).

In response to the print job being executed in the first image forming device 200-1, the cloud server 100' manages the cumulative charging data according to the usage of the first image forming device 200-1. That is, as illustrated in FIG. 27, the cloud server 100' manages the cumulative charging data 710 with respect to the 'Apartment building-A' group including the first image forming device 200-1.

Based on the charging data 710 with respect to the 'Apartment building-A' group, a date of use that the first mobile device 301-1 used the first image forming device 200-1, the usage history, the charging information on each usage history, and the cumulative charging information are matched with the phone number of the first mobile device 301-1. Further, a date that the second mobile device 301-2 used the first image forming device 200-1, the usage history, the charging information on each usage history, and the cumulative charging information are matched with the phone number of the second mobile device 301-2.

According to the above-described method, the cloud server 100' may manage the cumulative charging data of other group.

Figure 28:
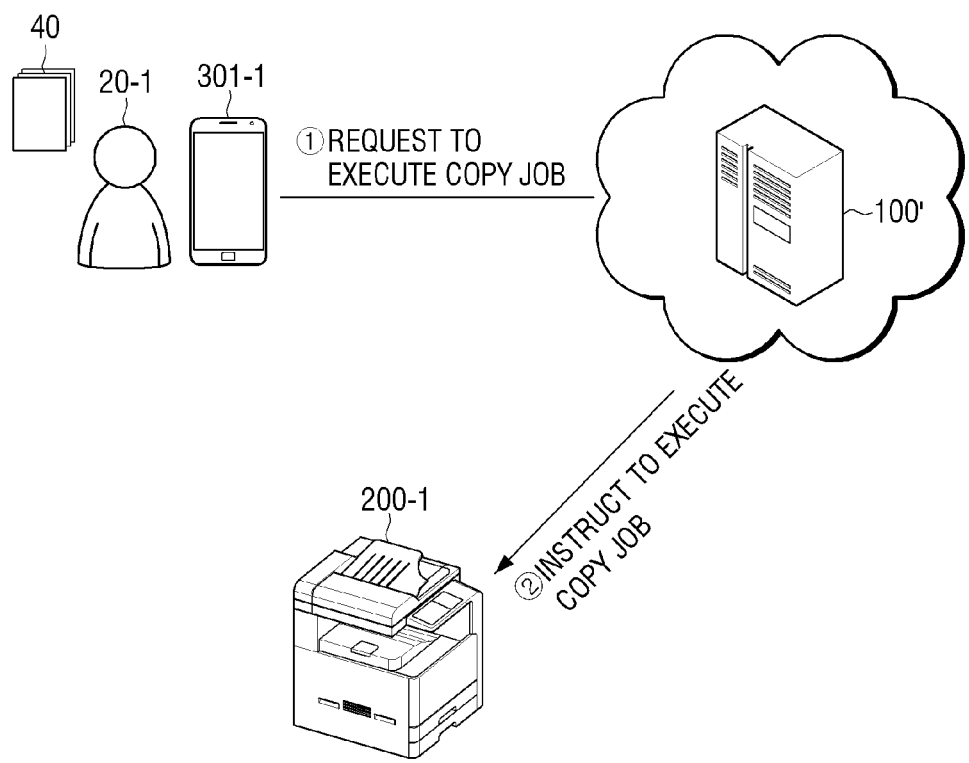
FIG. 28 is a diagram provided to describe a method for managing charging data according to execution of a copy job.

FIG. 28 is a diagram provided to describe a method for managing charging data according to execution of a copy job. Referring to FIG. 28, when a first user 20-1 wants to copy a document by using a first image forming device 200-1, the first user 20-1 puts the document on an automatic manuscript feed tray of the first image forming device 200-1. Subsequently, the first user 20-1 accesses a cloud server 100' by using a first mobile device 301-1 and requests for execution of a copy job using the first image forming device 200-1 to the cloud server 100' (① request to execute a copy job).

According to the request, the cloud server 100' retrieves the first image forming device 200-1 matched with a phone number of the first mobile device 301-1. Subsequently, the cloud server 100 may instruct the first image forming device 200-1 to execute the copy job (((② instruct to execute the copy job). According to the instruction, the first image forming device 200-1 may execute a scan job and a print job with respect to the document on the automatic manuscript feed tray of the first image forming device 200-1.

In the above embodiment, the first user 20-1 puts the document on the automatic manuscript feed tray of the first image forming device 200-1 before accessing the cloud server 100, but not limited thereto. For example, in response to the cloud server 100' instructing the first image forming device 200-1 to execute the copy job, the first image forming device 200-1 may notify that the first image forming device 200-1 is prepared to execute the copy job through a voice or a message. Accordingly, in response to the first user 20-1 putting on the document on the automatic manuscript feed tray and then pressing a 'Copy' button on the first image forming device 200-1, the first image forming device 200-1 may execute the copy job.

Meanwhile, although not illustrated and described in FIG. 28, the cloud server 100' may request for status information to the first image forming device 200-1 before instructing the first image forming device 200-1 to execute the copy job. Accordingly, the cloud server 100' may transmit the status information to an A/S center 700 or to the first mobile device 301-1, as illustrated in FIG. 27.

As described above, in response to the first image forming device 200-1 being used by the first mobile device 301-1, the cloud server 100 may manage the cumulative charging data 710 with respect to the 'Apartment building-A' group as illustrated in FIG. 27.

Figure 29:
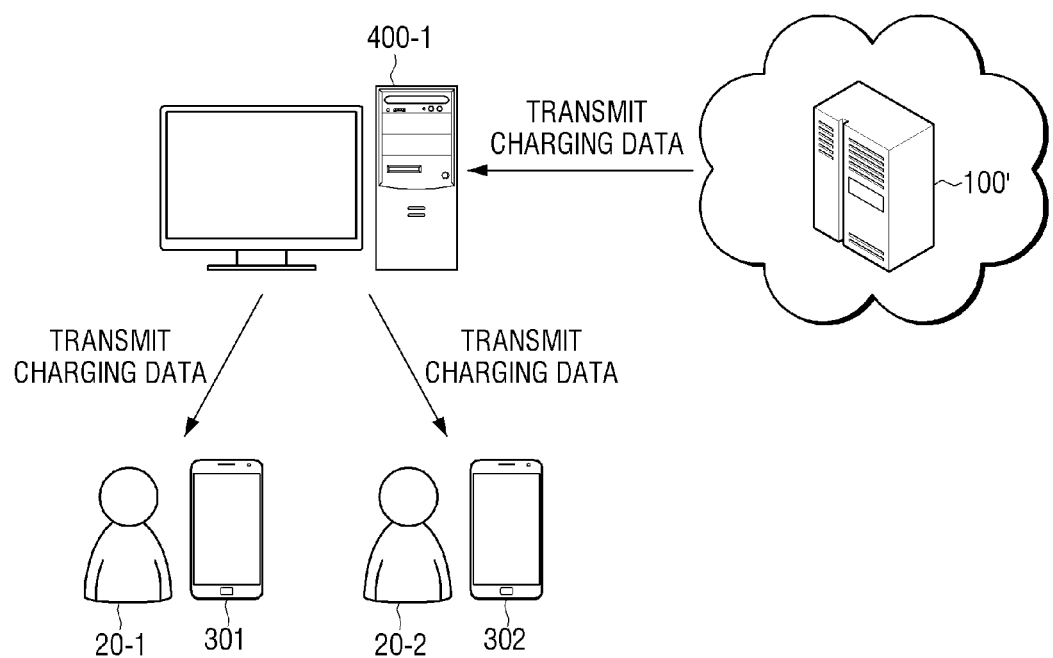
FIG. 29 is a diagram provided to describe a charging method according to an embodiment disclosed herein.

FIG. 29 is a diagram provided to describe a charging method according to an embodiment disclosed herein. Referring to FIG. 29, in response to an event for a charging operation occurring, a cloud server 100' may transmit charging data to each management server in a group unit corresponding to the event.

For example, on the first day of every month, the cloud server 100' may transmit the charging data with respect to an 'Apartment building-A' group including the first image forming device 200-1 to a first management server 400-1. Further, the cloud server 100' may transmit the charging data on other group to a management server corresponding to the group.

In response to receiving the charging data with respect to the 'Apartment building-A' group, the first management server 400-1 classify the charging data for each user and transmit the charging data to mobile device of each user.

For example, in response to the charging data with respect to the 'Apartment building-A' group including the charging data with respect to the first and second mobile devices 301-1, 301-2, the first management server 400-1 may transmit the charging data corresponding to each user to the first and second mobile devices 301-1, 301-2. In this case, the first management server 400-1 may transmit the account information for settling an amount corresponding to the charging data along with the charging data.

The first user 20-1 may check the charging data through the first mobile device 301-1, and the second user 20-2 may check the charging data through the second mobile device 301-2. Accordingly, the users 20-1, 20-2 may pay for the amount corresponding to the charging data by using the account information.

Figure 30:
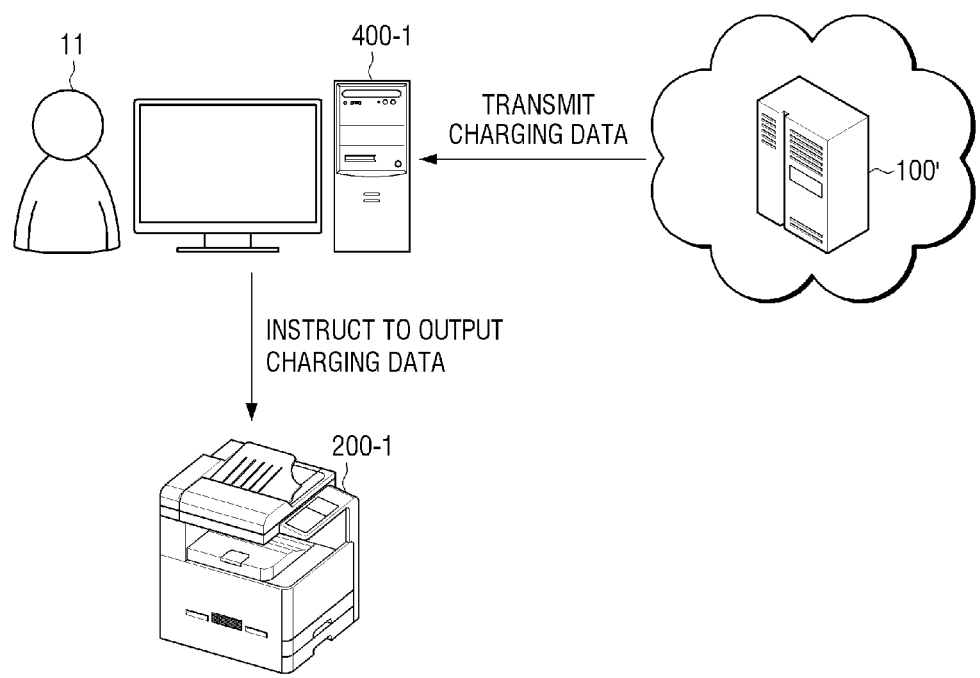
FIG. 30 is a diagram provided to describe a charging method according to another embodiment disclosed herein.

FIG. 30 is a diagram provided to describe a charging method according to another embodiment disclosed herein. Referring to FIG. 30, in response to an event for a charging operation occurring, a cloud server 40' may transmit charging data to each management server in a group unit corresponding to the event.

For example, on the first day of every month, the cloud server 100' may transmit the charging data with respect to the an 'Apartment building-A' group including a first image forming device 200-1 to a first management server 400-1.

The first management server 400-1 may classify the charging data received from the cloud server 100 for each user (that is, each resident). To be specific, the first management server 400-1 stores information on the entire users in 'Apartment building-A'. Further, the first management server 400-1 retrieves a user corresponding to a phone number of each mobile device included in the charging data based on the information.

For example, the first management server 400-1 retrieves a first user 20-1 corresponding to a phone number of a first mobile device 301-1 and a second user 20-1 corresponding to a phone number of a second mobile device 301-2.

The first management server 400-1 may transmit the charging data to the first image forming device 200-1 such that the first image forming device 200-1 outputs the charging data in a form of the charge bill. In this case, a first manager 11 may transmit the charge bills outputted in the first image forming device 200-1 to the first user 20-1 and the second user 20-2, respectively.

In this embodiment, the charging data according to the usage of the first image forming device 200-1 is transmitted to the first user 20-1 and the second user 20-2 in a form of the charge bill, but not limited thereto.

For example, the first management server 400-1 may manage, charge, and authorize the maintenance fees of the users in the 'Apartment building-A' building. Accordingly, the first management server 400-1 may output a maintenance fee bill where the amount corresponding to the charging data is added to the maintenance fees through the first image forming device 200-1. Further, the first manager 11 may transmit the maintenance fee bill to the first user 20-1 and the second user 20-2.

Figure 31:
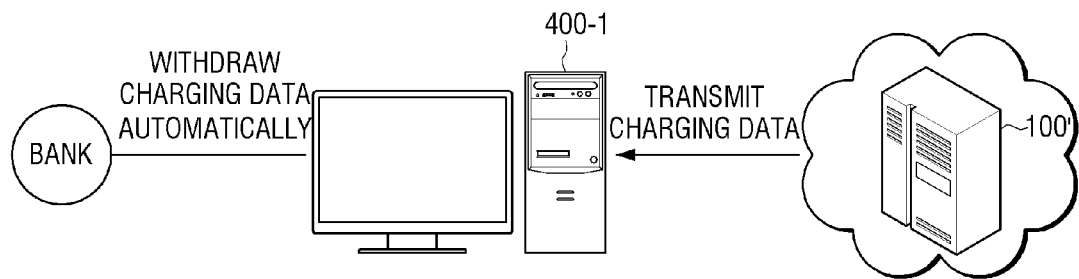
FIG. 31 is a diagram provided to describe a charging method according to still another embodiment disclosed herein.

FIG. 31 is a diagram provided to describe a charging method according to still another embodiment disclosed herein. Referring to FIG. 31, in response to receiving the charging data with respect to first and second mobile devices 301-1, 301-2 from a cloud server 100, a first management server 400-1 may automatically withdraw an amount corresponding to the charging data by using account information on a bank account of a first user 20-1 or a second user 20-2 based on account information associated with the users.

FIG. 32 is a flowchart provided to describe a method for supporting an image forming service of a cloud server according to an embodiment disclosed herein. Referring to FIG. 32, in response to receiving a job execute request for an image forming job from a mobile device (S3210), a cloud server instructs an image forming device matched with the mobile device to execute the image forming job (S3220).

In this case, the image forming device may have been registered at the cloud server by a management server, and the cloud server may classify and store at least one mobile device matched with the image forming device in a group unit. In response to a plurality of mobile devices being stored, the cloud server may classify and store the plurality of mobile device in a plurality of group units according to a plurality of image forming devices.

The cloud server manages cumulative charging data according to the usage of the image forming device (S3230). For example, in response to a first mobile device accessing the cloud server and using the first image forming device a plurality of times, the cloud server may add and store the charging data according to the plurality of times of usage.

In response to an event for a charging operation occurring (S3240), the cloud server transmits the charging data to a management server in a group unit corresponding to the event (S3250). In this case, the event for a charging operation may be one of an event where a request with respect to the charging data is received from the management server, an event where a data transmission cycle being predetermined in connection with the charging data elapses, and an event where the number of data accumulation being configured in connection with the charging data overruns.

The group unit corresponding to the event may be at least one mobile device matched with the image forming devices. Accordingly, the cloud server may transmit the charging data with respect to at least one mobile device matched with each image forming device to the management server.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to a person having ordinary skill in the art.

What is claimed is:

1. At least one server connectable to a mobile device, the at least one server comprising:
    at least one processor to,
        generate a virtual work group associated with the mobile device to include a plurality of image forming devices to be controlled by the mobile device, and
        generate information to display a user interface, UI, to receive input of a virtual task group of a plurality of tasks to perform one job, each task respectively corresponding to a different function supported by an image forming devise from among the plurality of image forming devices in the virtual work group, to perform the one job; and
    a communication interface hardware component to transmit the generated information for the UI to the mobile device to cause the mobile device to display the UI for the receiving of the virtual group of the plurality of different tasks of the one jab.

2. The at least one server as claimed in claim 1, wherein in response to receiving an execute command for the one job of the virtual task group, the at least one processor is to,
    control the communication interface hardware component such that a first image forming device of the plurality of image forming devices in the virtual work group executes a first task, among the tasks of the one job, corresponding to a first function supported by the first image forming device, and a second image forming device e the plurality of image forming devices in the virtual work group executes a second task, among the tasks of the one job, corresponding to a second function different from the first function and supported by the second image forming device.

3. The at least one server as claimed in claim 2, wherein the at least one processor s to control the communication interface hardware component such that control commands related to the one job of the virtual task group with respect to the first image forming device and the second image forming device are transmitted to the first image forming device in batches.

4. The at least one server as claimed in claim 2, wherein the at least one processor is to control the communication interface hardware component such that a first control command for executing the first task of the one job of the virtual task group is transmitted to the first image forming device, and a second control command for executing the second task of the one job of the virtual task group is transmitted to the second image forming device.

5. The et least one server as claimed in claim 1, wherein the generated information to display the UI is a generated webpage.

6. The at least one server as claimed in claim 1, wherein the communication interface hardware component receives information including phone numbers for specifying corresponding image forming devices of the plurality of image forming devices, from the mobile device, wherein the at least one processor is to generate the virtual work group including the plurality of image forming devices corresponding to the received phone numbers.

7. The at least one server as claimed in claim 6, wherein the communication interface hardware component receives the phone numbers and a function number for specifying a function of an image forming device among the plurality of image forming devices,
wherein the at least one processor is to generate the virtual work group of the plurality of image forming devices corresponding to the received phone numbers and the function number.

8. The at least ore server as claimed in claim 1, wherein the communication interface hardware component receives work group information on the plurality of image forming devices from an image forming device among the image forming devices to generate the virtual work group based on the received work group information.

9. The at least one server as claimed in claim 1, wherein the at least one processor is to generate a phone number corresponding to the virtual work group, and in response to receiving a request for the one job of the virtual work group with respect to the phone number, execute the one job of the virtual work group corresponding to the phone number to be executed.

10. An image forming device communicatively connectable to a server which is communicatively connectable to a mobile device, the image forming device comprising:
a communication interface hardware component to receive a job execute command for a virtual task group of a plurality of tasks to perform one job, each task respectively corresponding to a different function supported by an other image forming device from among a plurality of image forming devices in a virtual workgroup; and
a processor to,
execute a first task, among the tasks of the one job of the virtual task group, corresponding to a first function supported by the image forming device included in the virtual work group, and
control the communication interface hardware component to transmit a second task, among the tasks of the one job of the virtual task group, to the other image forming device among the plurality of image forming devices in the virtual work group.

11. A printing control method in a server communicatively connectable to a mobile device, the method comprising:
generating, by the server, a virtual work group associated with the mobile device to include a plurality of image forming devices to be controlled by the mobile device;
generating, by the server, information to display a User Interface, UI, to receive input of a virtual task group of a plurality of tasks to perform one job, each task respectively corresponding to a different function supported by an image forming device from among the plurality of image forming in the virtual work group, to perform the one job; and
transmitting, by the server, the generated information for the UI to the mobile device to cause the mobile device to display the UI for the receiving of the virtual group of the plurality of different tasks of the one job.

12. The method as claimed in claim 11, further comprising:
receiving, by the server, an execute command for the one job of the virtual task group; and
causing, by the server, a first image forming device of the plurality of image forming devices in the virtual work group to execute a first task, among the task of the one job, corresponding to the first function supported by the first image forming device and causing a second image forming device of the plurality of image forming devices in the virtual work group to execute a second task, among the tasks of the one job, corresponding to a second function different from the first function and supported by the second image forming device.

13. The method as claimed in claim 11, further comprising:
generating, by the server, a phone number corresponding to the virtual work group; and
controlling, by the server, in response to receiving a request for the one job of the virtual work group with respect to the phone number, the one job of the virtual work group corresponding to the phone number to be executed.

14. A printing control method of an image forming device communicatively connectable to a server which is connectable to a mobile device, the method comprising:
receiving, by the image forming device, a job execute command for a virtual task group of a plurality of tasks to perform one job, each task respectively corresponding to a different function supported by an other image forming device from among a plurality of image forming devices in a virtual workgroup;
executing, by the image forming device, a first task, among the tasks of the one job of the virtual task group, corresponding to a first function supported by the image forming device included in the virtual work group; and
transmitting, by the image forming device, a second task, among the tasks of the one job of the virtual task group, to the other image forming device among the plurality of image forming devices in the virtual work group.

* * * * *

UNITED STATES PATENT AND TRADEMARK OFFICE
CERTIFICATE OF CORRECTION

PATENT NO. : 10,158,783 B2  
APPLICATION NO. : 15/306367  
DATED : December 18, 2018  
INVENTOR(S) : Jae-wook Cho et al.

Page 1 of 1

It is certified that error appears in the above-identified patent and that said Letters Patent is hereby corrected as shown below:

In the Claims

In Column 52, Claim 1, Line 23, delete "devise" and insert -- device --, therefor.

In Column 52, Claim 1, Line 30, delete "jab." and insert -- job. --, therefor.

In Column 52, Claim 2, Line 40, delete "e" and insert -- of --, therefor.

In Column 52, Claim 3, Line 46, delete "s" and insert -- is --, therefor.

In Column 52, Claim 5, Line 60, delete "et" and insert -- at --, therefor.

In Column 53, Claim 8, Line 13, delete "ore" and insert -- one --, therefor.

In Column 53, Claim 10, Line 34-35, delete "workgroup" and insert -- work group --, therefor.

In Column 54, Claim 11, Line 4, after "forming" insert -- devices --.

In Column 54, Claim 14, Line 43, delete "workgroup" and insert -- work group --, therefor.

Signed and Sealed this  
Sixteenth Day of April, 2019

Andrei Iancu  
*Director of the United States Patent and Trademark Office*